US012663378B2

(12) United States Patent
Hassell et al.

(10) Patent No.: US 12,663,378 B2
(45) Date of Patent: Jun. 23, 2026

(54) 3-D PRINTED PROBES FOR BIOPROCESSES

(71) Applicant: Nirrin Technologies, Inc., Billerica, MA (US)

(72) Inventors: Bryan A. Hassell, Cambridge, MA (US); David P. Marchessault, Hopkinton, MA (US)

(73) Assignee: NIRRIN TECHNOLOGIES, INC., Billerica, MA (US)

( * ) Notice: Subject to any disclaimer, the term of this patent is extended or adjusted under 35 U.S.C. 154(b) by 1058 days.

(21) Appl. No.: 17/684,499

(22) Filed: Mar. 2, 2022

(65) Prior Publication Data

US 2022/0307986 A1     Sep. 29, 2022

Related U.S. Application Data

(60) Provisional application No. 63/173,706, filed on Apr. 12, 2021, provisional application No. 63/155,319, filed on Mar. 2, 2021.

(51) Int. Cl.
*G01N 21/85*     (2006.01)
*G01N 15/0205*     (2024.01)
(Continued)

(52) U.S. Cl.
CPC ..... *G01N 21/8507* (2013.01); *G01N 15/0205* (2013.01); *G01N 21/359* (2013.01); *G01N 21/552* (2013.01); *B33Y 80/00* (2014.12)

(58) Field of Classification Search
CPC ............. G01N 21/8507; G01N 21/359; G01N 21/552; G01N 15/0205; G01N 15/359;
(Continued)

(56) References Cited

U.S. PATENT DOCUMENTS 4,893,935 A * 1/1990 Mandel .............. G01N 21/8507
                                                          356/442
5,694,206 A * 12/1997 Curtiss ............... G01N 21/8507
                                                          356/417
(Continued)

OTHER PUBLICATIONS

Cervera, A.E., et al., "Application of Near-Infrared Spectrscopy for Monitoring and Control of Cell Culture and Fermentation," Biotechnol. Prog., 25(6): 1561-1581 (2009).
(Continued)

*Primary Examiner* — Michael L Hobbs
(74) *Attorney, Agent, or Firm* — Wiggin and Dana LLP

(57)     ABSTRACT

A device for monitoring a bioreactor is designed for in-situ analysis, e.g., by NIR. The device is configured for maintaining a sample detection region in the reactor medium and can include two or more components, at least one of which is fabricated additively. In an example, a light beam propagates along a free space optical path, passes through a thin 3D printed layer and traverses the sample detection region, where it becomes modulated or modified by interactions with analytes present in the bioreactor. The transmitted light reaches and passes through another thin 3D printed layer and is detected by a photodetector, internal to the device. The electrical signal from the photodetector can be directed to an analyzer via electrical connections. The device or a component thereof can be designed for single use applications.

20 Claims, 17 Drawing Sheets

(51) Int. Cl.
 *G01N 21/359*  (2014.01)
 *G01N 21/552*  (2014.01)
 *B33Y 80/00*  (2015.01)

(58) Field of Classification Search
 CPC .............. G01N 15/01; G01N 15/1456; G01N
     2015/1486; G01N 2015/1493; C12M
           41/00; B33Y 80/00
 See application file for complete search history.

(56)     References Cited

U.S. PATENT DOCUMENTS

| | | | |
|---|---|---|---|
| 6,003,362 A * | 12/1999 | Dieckmann ........ | G01N 33/0011 |
| | | | 73/19.05 |
| 2005/0264817 A1* | 12/2005 | Havard ................ | G01N 21/532 |
| | | | 356/442 |
| 2010/0035337 A1* | 2/2010 | Bahnemann ........... | C12M 27/02 |
| | | | 435/292.1 |
| 2019/0358632 A1 | 11/2019 | Hassell et al. | |
| 2020/0408575 A1* | 12/2020 | Ott ......................... | C12M 23/00 |
| 2021/0062133 A1 | 3/2021 | Hassell et al. | |
| 2021/0088433 A1 | 3/2021 | Hassell et al. | |
| 2021/0371785 A1 | 12/2021 | Hassell et al. | |

OTHER PUBLICATIONS

Davies, A.M.C., "An Introduction to Near Infrared (NIR) Spectroscopy," IM Publications, 1-4 (2005).
Roggo, Y., et al., "A Review of Near Infrared Spectroscopy and Chemometrics in Pharmaceutical Technologies," Journal of Pharmceutical and Biomedical Analysis, 44: 683-700 (2007).

* cited by examiner

Optical Fiber
130

Fiberport Optical Adjuster
128

Detector Signal Receptable
124

3d Printed Fiberport Mount
126

Isolated Optical Channel
118

Detector Wire Channel
122

3d Printed 12mm OD Tube
116

Free Space Optical Path
120

3d Printed Tip
114

Sample Detection Area
112

3d Printed Optics Mount

124

3d Printed 12mm OD Tube

3d Printed Tip

3d Printed Optics Mount

Length: 50mm

Length: 100mm

Length: 200mm

3D Printed In-Situ Probe

3D Printed In-Situ Probe Section View

3D Printed In-Situ Probe Tip Section View

3d Printed Tube  504

Free Space Optical Beam Path  520

3d Printed Tube  502

Biocompatible Epoxy  526

Quartz or Sapphire Rod  522

3d Printed Tip  510

Sample Detection Area  112

Quartz or Sapphire Rod  524

Biocompatible Epoxy  526

Lens  154

Photodiode Detector  156

Signal Amplification Wires  530

Signal Amplification PCB  530

3d Printed Cap  520

610

VCSEL/LED Wires 632

3d Printed Tube 504

VCSEL/LED Source 630

Lens 634

3d Printed Tip 610

612

3d Printed Optical Window 180

Sample Detection Area 112

182

Lens 154

166

Photodiode Detector 156

Photodetector Wires 160, 162, 164

160

614

164

162

EPDM O-ring 174

3d Printed Threaded Plug 636

3D Printed In-Situ Probe Section View: Fiber In/Fiber Out

700A

3d Printed Tube
504

Optical Fiber In
702

Optical Fiber Out
704

Collimating Lens
712

Collecting Lens
714

Optical Beam
Path

Sapphire Tip
710

720a

720b

Sample Gap
112

722b

716

722a

Total Internal
Reflection

3d Printed Cap
718

724

3-D PRINTED PROBES FOR BIOPROCESSES

RELATED APPLICATIONS

This application claims the benefit under 35 USC 119(e) of U.S. Provisional Patent Application No. 63/173,706, filed on Apr. 12, 2021, and U.S. Provisional Patent Application No. 63/155,319, filed on Mar. 2, 2021, both of which are incorporated herein by this reference in their entirety.

BACKGROUND OF THE INVENTION

Processes that use complete living cells or their components (bacteria, enzymes, chloroplasts, for example) are generally known as bioprocesses. Often, such processes (and many others in industries as diverse as chemical, food, beverages, environmental, etc.) can be described as including upstream and downstream phases that require specific protocols and equipment.

Current trends in bioprocessing are increasingly moving toward single-use systems (SUS) designed to be employed once (or for a single manufacturing campaign) and then discarded. Generally, SUS are composed primarily of plastic components that have been sealed and sterilized using gamma radiation.

An important feature when conducting a bioprocess, whether in a conventional or a single use system, relates to probes for monitoring reactor and/or process parameters. Sensors have been developed and are available for measuring pH, dissolved oxygen (DO), temperature or pressure in-situ and in real-time. Common techniques for detecting chemical constituents include high performance liquid chromatography (HPLC), gas chromatography-mass spectroscopy (GCMS), or enzyme- and reagent-based electrochemical methods.

While considered accurate, many existing approaches for monitoring substances in a reactor are conducted off-line, tend to be destructive with respect to the sample, often require expensive consumables and/or take a long time to complete. In many cases, the equipment needed to perform these analyses is expensive, and requires calibrations and trained operators. Procedures may be time- and labor-intensive, features that are often mitigated by decreasing the sampling frequency of a given process, thus reducing the data points. Often, samples are run in batches, after the process has been completed, yielding little or no feedback for adjusting conditions on an ongoing basis. Drawbacks such as these can persist even with automated sampling operations.

Various optical spectroscopy approaches are available to assess components, also referred to as analytes, in a sample. Among these, probably the most common is absorption spectroscopy. Incident light excites electrons of the analyte from a low energy ground state into a high energy, excited state, and the energy can be absorbed by both non-bonding n-electrons and π-electrons within a molecular orbital. Absorption spectroscopy can be performed in the ultraviolet, visible, and/or infrared region, with analytes of varying material phases and compositions being interrogated by specific wavelengths or wavelength bands of light. The resulting transmitted light is then used to resolve the absorbed spectra, to determine the analyte's or sample's composition, temperature, pH and/or other intrinsic properties for applications ranging from medical diagnostics, pharmaceutical development, food and beverage quality control, to list a few.

Another option is Raman spectroscopy, which works by the detection of inelastic scattering of typically monochromatic light from a laser.

SUMMARY OF THE INVENTION

While progress is being made toward SUS, the development of single use probes, and especially that of in-situ probes designed to monitor bioreactors by spectroscopic means, lags. Such probes often involve complex internal geometries and are often made, at least in part, from stainless steel. Due to the high machining cost, they are not considered good candidates for single use applications.

A need exists for in-situ probing devices that, in spite of having demanding geometries, can be fabricated in a cost-effective manner. A need also exists for in-situ probing devices that can be discarded, together with single use bioreactors, for instance. Systems that incorporate an in-situ single use probe device that relies on spectroscopic analysis are desired as well.

In many of its aspects, the invention relates to a device and/or method for monitoring, in-situ, an ongoing process, such as, for example, a process conducted in a bioreactor. Cells and/or substances present in the bioreactor (or another vessel) are identified and often quantified using a suitable technique. In many embodiments, the contents of the bioreactor are monitored using spectroscopy (absorption, Raman, fluorescence, etc.). Specific implementations rely on near infrared (NIR) absorption spectroscopy.

Monitoring devices employed (or components thereof) are fabricated by additive manufacturing, 3D printing, for instance. In many cases, the 3D printing is conducted according to established protocols using available equipment, as known in the art or as developed in the future. In a typical approach, the 3D printing technique relies on capturing the three-dimensional configuration of the device, using, for instance, computer-aided design software. The 3-dimensional drawing or sketch is then deconstructed by a suitable software package into 2-dimensional slices and the information is used by the 3D equipment to fabricate the device layer by layer.

In specific embodiments, the fabrication process utilizes biocompatible materials (e.g., plastics) that are suitable for 3D printing and can withstand reactor conditions without degradation. Many probe devices described herein are made of biocompatible plastics and often are designed for single use applications. Metal, e.g., stainless steel, 3D printing can be employed in some instances, to fabricate reusable probes, for example.

Spectroscopic methods and, generally, methods that require passing electromagnetic radiation through a sample often require optical components. A typical sample cell, for example, is provided with windows that are transparent to light in the desired wavelength region. In many cases, the windows also represent the seal that keeps the reactor medium out of the probe and/or maintains contaminants within the probe and out into the reactor. As a result, attaching optical windows to sample cells or probes can present difficulties. Assembling leak-free mountings (in order to prevent sample dilutions, contaminations, etc.) can be time consuming and technically challenging, often requiring physical adjustments and extensive testing and validation.

It was discovered that 3D printing could dispense with traditional windows by generating areas or sections that are an intrinsic part of the 3D probe (or component thereof) and that can be thin enough to allow light to pass through and still be detected on the other side. The thickness of these "windows" can be within a range of from about 100 to about 500 microns (μm), for example. Even windows with optical power or lenses are printed in some cases.

In some implementations, the analysis is conducted without withdrawing a sample from the reactor using a device configured for introducing an interrogating beam of electromagnetic radiation into the reactor, where the beam traverses a pathlength formed within the reactor medium. In some cases, the transmitted radiation is conveyed (via fiber optics, for instance) to an external detector. In others the transmitted radiation is detected by a photodetector disposed within the reactor; the electrical signal generated is conveyed via electrical wiring for external analysis.

One illustrative device comprises a 3D printed tubular body and a 3D printed tip section at the end of the tube. The tip section has a sample detection region defined by an optical transmission port and an optical detection port. 3D printing can fabricate one or both ports as integrated sections formed in thin optically transmissive layers to constitute a substitute for conventional windows, made of glass for example. The light received through the optical detection port is detected by a photodetector housed in the tip section. In specific embodiments the photodetector (alone or together with other optical components) is supported by an optics mount which can be 3D printed as well.

In one implementation the device includes a free space path for propagating light through the device toward the optical transmission port. Also included is a channel for the electrical wiring needed to transmit the electrical signal from the photodetector to an analyzer.

According to one illustration, an interrogation light beam is generated by a tunable laser that sweeps a narrow band emission across an infrared spectral band. Light propagates along the free space path to the optical transmission port, traverses the sample detection region and enters the optical detection port. A lens in the tip section can be helpful for conditioning, i.e., focusing or collimating, the light transmitted across the sample detection region. From the lens, the light reaches the photodetector and from there, the electrical signal is conveyed and analyzed externally.

In another approach, samples are obtained and analyzed, e.g., by NIR, using a 3D printed sample tube that can be inserted into a vessel, e.g., a bioreactor. The sample tube used for extracting a sample from the bioreactor can be combined or integrated with a sample cell configured for NIR interrogation and analysis. This sample cell can be fabricated by conventional machining or by an additive manufacturing method. During operation, samples are collected from the bioreactor (or another vessel), analyzed in real time, in a nondestructive manner, and returned to the bioreactor once the analysis is completed. Many implementations utilize a peristaltic pump that is operated as a reversible/reciprocating pump. A sterile filter can be used to separate conduits occupied by the bioreactor sample from the pumping system.

In yet another approach, the monitoring device is fabricated by 3D printing and includes a light source that is internal to the probe such as a vertical cavity surface emitting laser (VCSEL) or laser emitting diode (LED). The light from within the probe can be directed through a sample region and directly onto a detector. In one implementation the design relies on electrical input/output (I/O), without a need for fiber optics. An I/O connector, a pin connector to the detector and a mounted lens assembly for collimating the VCSEL light also can be included.

Further embodiments relate to a system which includes a 3D printed probing device such as described herein and a reactor. In one example, the probe is used to monitor a process conducted in a rocking bioreactor. Advantageously, a 3D printed single use probe can be discarded along with a single use bioreactor bag.

The 3D printed probe can be used to monitor stir tank or other types of reactors. Some applications, for instance, relate to monitoring bioreactors designed for perfusion culture (reactors in which the culture medium and product are constantly flowing out of the reactor). This culture-product stream can be analyzed in real time by attaching a consumable flow cell fabricated by 3D printing.

Probes manufactured by additive machining, such as, for instance, 3D printing, present many advantages and are particularly well suited to construct intricate and complex geometries, often at a very reasonable cost. Approaches described herein can produce probes compatible with various absorption spectroscopic techniques (ranging from ultraviolet to the mid-infrared region), Raman and others.

Easily and inexpensively produced, 3D printed probes can extend reactor monitoring applications, e.g., during cell cultivation and/or other processes. In many cases, the device described herein can be designed for single use applications. In contrast to classic glass and/or stainless steel construction, single use devices can be sterilized (e.g., by gamma radiation) as part of their manufacture and do not require subsequent cleanings, sterilizations and validations of sterilization.

Whereas many existing approaches rely on removing and/or circulating cells in loops external to the process vessel, typically through a pumping system, some of the in-situ 3D printed probes described herein reduce, minimize and often eliminate the exposure of the bioreactor contents to conditions external to the bioreactor. In addition, cells are prevented from being drawn into the pumping system.

A versatile approach, 3D printing can be used to fabricate not only probes in which the sample being analyzed remains in the reactor but also devices external to the reactor. In one such example, measurements are performed on a sample that circulates through a flow or sample cell outside the reactor. This cell can be constructed by 3D printing, e.g., for single use, and can be attached to or inserted in conduits for continuous flow reactors. In another example, measurements are taken on a sample that is withdrawn from the reactor and maintained in an external 3D printed sample cell for the time needed to perform the analysis.

3D printing can greatly simplify probe manufacturing, while also addressing specific needs. For instance, it can be used to form optical pathlengths suitable for various electromagnetic regions, (from long, e.g., within a range of about 5 to 10 mm for UV to short, e.g., of about 100 μm for mid-infrared, the latter gap being difficult to produce or even inaccessible by conventional machining).

In some cases, the methods described herein can produce light transmission sections (e.g., with a thickness of about 100 to 500 μm) that are generated during the additive manufacture process and constitute an integral region (also referred to herein as a "port", "area" or "section") of the probe. By replacing traditional windows that typically are provided as separate parts, needing to be mounted or attached, often in watertight fashion), these sections reduce assembly efforts, and/or ongoing problems raised by potential leaks and contaminations when the probe is submerged in a reactor medium.

Detachable components increase flexibility. In some cases, for example, a component can be fabricated from sterilizable materials and reused, while others can be intended for single use applications.

Traditionally, an in-situ probe may include a stainless steel tube that is inserted into a reactor. If the tube length is too short or too long relative to the reactor size, additional stainless steel tubes need to be machined. With 3D printing, however, any number of tube segments can be easily fabricated, to be assembled as needed, using O-rings or other fluidically sealed means. Having this option simplifies fabrication, reduces costs and increases the flexibility and versatility of the probe.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1:
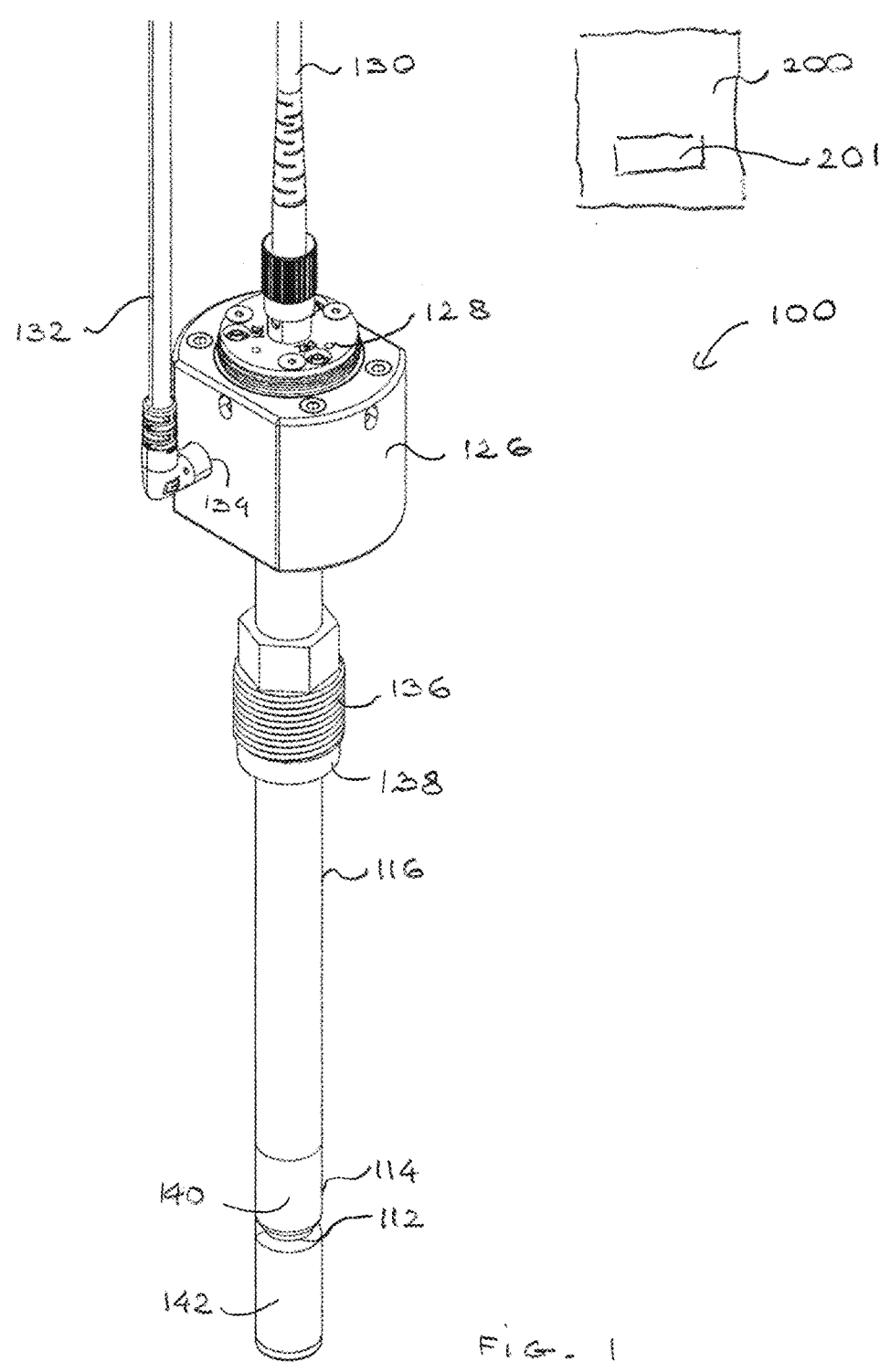
FIG. 1 is an isometric view of an in-situ 3D printed probe controlled by a controller according to one embodiment.
Figure 2:
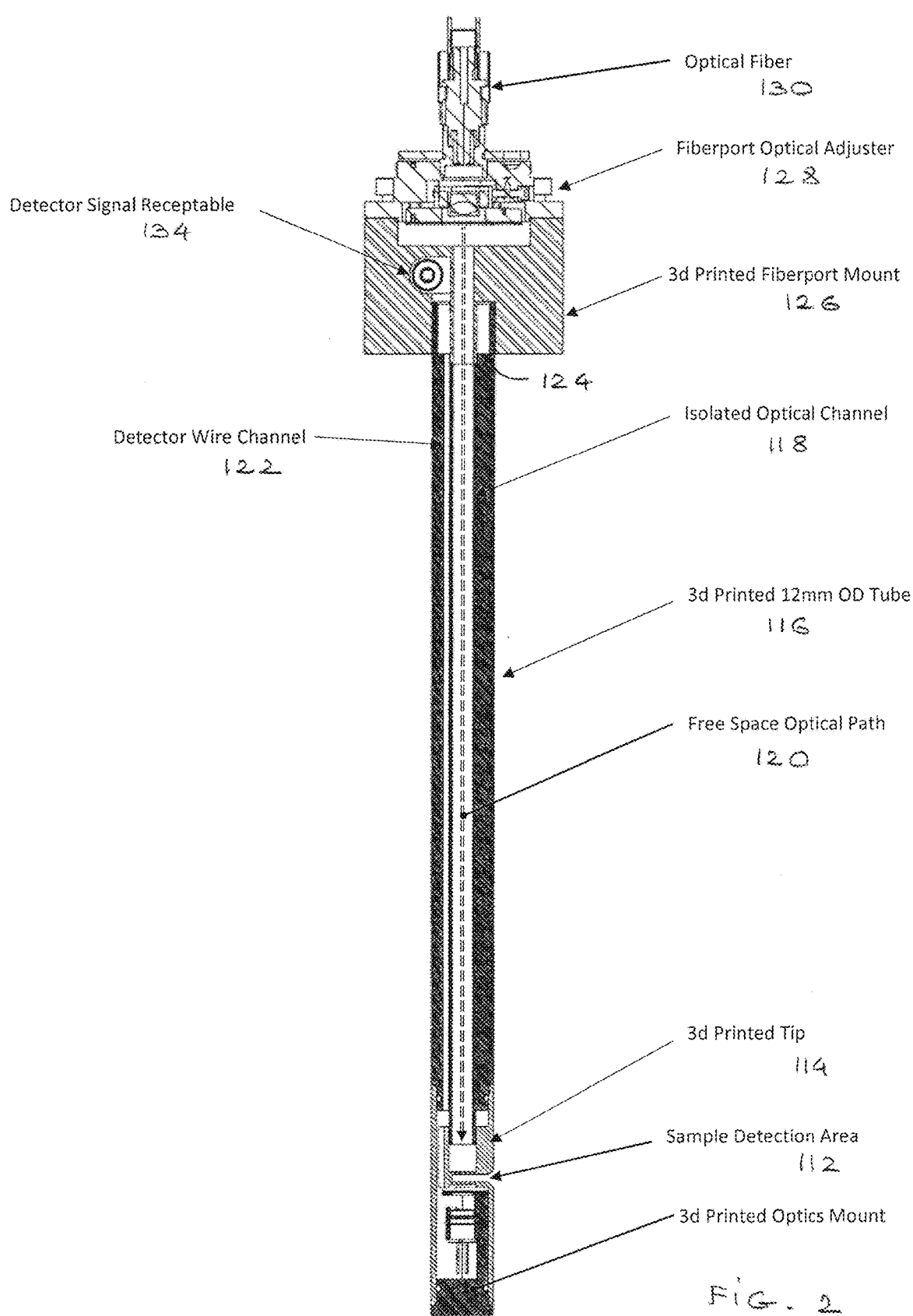
FIG. 2 is a vertical cross-sectional view of the 3D printed probe of FIG. 1.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many processes conducted in bioreactors require or benefit from a stringent control of parameters such as pH, levels of oxygen, nutrients, metabolites and/or other species. The present invention generally relates to devices and methods for analyzing the contents of a reactor, on an ongoing basis, for example. Cells, for instance, and/or other reactor constituents can be detected, at various time intervals and the data can be used to assess conditions. Based on this information, process parameters can be adjusted or optimized. Examples of processes that can be monitored include cell growth protocols, fermentations, and many others. In one embodiment, the reactor monitored is a bioreactor having, for instance, a suitable design and application. The bioreactor can be characterized by a specific volume or dimensions, as known in the art or as developed in the future. Devices and techniques described herein can be used in conjunction with stir tank bioreactors, rocking bioreactors, perfusion type bioreactors and many others.

In one implementation, the bioreactor houses or is a cell culture system for the three-dimensional assembly, growth and differentiation of cells and tissues. The bioreactor can contain cells, culture media, nutrients, metabolites, enzymes, hormones, cytokines and so forth. At least some of these constituents are analyzed using a spectroscopy system for determining the spectral response of the components in a sample. Analysis can be in one or more of the following electromagnetic spectral regions: millimeter, microwave, terahertz, infrared (including near-, mid- and/or far-infrared), visible, ultraviolet (UV), x-rays and/or gamma rays. Further, the spectroscopy system can measure different characteristics, such as absorption spectra, emission (including blackbody or fluorescence) spectra, elastic scattering and reflection spectra , impedance (e.g., index of refraction) spectra, and/or inelastic scattering (e.g., Raman and Compton scattering) spectra, of analytes in the bioreactor.

Illustrative embodiments described herein rely on spectroscopy in the ultraviolet, visible regions, or the infrared region, e.g., extending from 700 nanometers (nm) to 1 millimeter (mm) in wavelength and specifically including the near infrared (0.75-1.4 microns (μm), NIR), short-wavelength infrared (1.4-3 μm, SWIR), mid-wavelength infrared (3-8 μm, MWIR), long-wavelength infrared (8-15 μm, LWIR), and the far infrared (15-1000 μm, FIR) of the spectrum.

Probing molecular overtone and combination vibrations, NIR-SWIR spectroscopy covers the region of from 780 nanometer (nm) to 2500 nm of the electromagnetic spectrum. An overview of NIR spectroscopy can be found, for example, in an article by A.M.C. Davies in "An Introduction to Near Infrared (NIR) Spectroscopy", www.impublications.com/content/introduction-near-infrared-nir-spectroscopy. See also, Cervera, A. E., Petersen, N., Lantz, A. E., Larsen, A. & Gernaey, K. V. Application of near-infrared spectroscopy for monitoring and control of cell culture and fermentation, Biotechnol. Prog. 25, 1561-1581 (2009); and Roggo Y, et al., "A review of near infrared spectroscopy and chemometrics in pharmaceutical technologies", Journal of Pharmaceutical and Biomedical Analysis, Volume 44, Issue 3, 2007.

Among its strength, infrared spectroscopy presents a non-invasive, non-destructive investigative approach, typically involving fast scan times. A discussion of NIR as applied to microfluidic and other systems is provided in U.S. patent application Ser. No. 16/419,690, to Hassell et al., filed on May 22, 2019, and published as Pub. No. US 2019/0358632 A1, and incorporated herein in its entirety by this reference.

Described herein are devices employed to detect substances present in a bioreactor using, for instance, techniques such as described above. The devices are fabricated by an additive manufacturing process such as three-dimensional or 3D printing. The devices can be designed for single use, bypassing the need to reinsert the device in the bioreactor and thus related autoclaving requirements.

The term "3D printing" generally refers to an additive process in which a material (e.g., a polymer, metal or another solidifiable substance) is deposited, joined or solidified under computer control, to create a three-dimensional object. In general, devices described herein are formed layer by layer and each layer can be viewed as a thinly sliced cross section of the object. Since the 3D printer can be instructed not to deposit any material in a certain region, it is possible to generate parts that have complex geometries, especially internally. 3D printing allows shaping undercuts or cavities that are difficult to achieve by conventional milling, turning or casting.

Various 3D printing processes, typically characterized by the manner in which the layers are deposited to create an article, and the materials utilized, have been and continue to be developed. Currently, ISO/ASTM52900-15 describes the following additive manufacturing (AM) processes: binder jetting, directed energy deposition, material extrusion, material jetting, powder bed fusion, sheet lamination, and vat photopolymerization.

Any number of 3D methods can be employed to fabricate the devices described herein. Selecting a specific approach can depend on the intended application, available printing materials, conditions to which the device is exposed (temperature, degree of agitation, stirring mechanisms, reactions taking place, biocompatibilities between reactor constituents and probe, etc.), desired mechanical properties, appearance, surface finish, speed of manufacture and cost, to name a few.

Fused deposition modeling (FDM), for example, involves extruding a thermoplastic polymer in the form of filament through a heated nozzle. The polymer is melted and applied onto a platform. As the droplets solidify, the intended object is built, layer-by-layer from the bottom to the top, until the object is completed.

FDM 3D printing is well-suited for basic proof-of-concept models, quick or low-cost prototypes, and many simple parts. One advantage of some FDM printing systems is the availability of a wide range of thermoplastic filament materials. While accuracy and resolution may be lower than with other 3D printing techniques, some FDM printers provide soluble supports to address some of these deficiencies.

Stereolithography (SLA) methods rely on photopolymerization (curing of photo-reactive polymers or resins when exposed to visible or ultraviolet light, typically produced by a laser. A first thin layer (25-100 μm) of resin between the bottom of the resin reservoir and a support is cured under the light according to a cross-section of the object that needs to be printed. The support then lifts the object and new resin flows underneath the first layer and is illuminated by the polymerizing radiation, forming the next cross-section of the object. The process repeats, building the object from top to bottom, until the task is completed. SLA can be slower and more expensive than FDM but can produce high quality parts at a fine resolution. SLA techniques are often used for high-accuracy, isotropic parts that may require tight tolerances, fine features and smooth surface finish. SLA resin formulations offer a wide range of optical, mechanical, and thermal properties.

Laser sintering (SLS), another common 3D printing approach, relies on a high-power laser to sinter small particles of polymer or metal powder into a solid structure. The unfused powder can be used to support the part during printing and eliminates the need for dedicated support structures. SLS is particularly advantageous when creating complex geometries, including interior features, undercuts, thin walls, and negative features. Parts produced with SLS printing have excellent mechanical characteristics, with strength resembling that of injection-molded parts. Many SLS systems utilize nylon, a material known for its strength, flexibility, light weight and, importantly, its stability with respect to many chemicals, heat, and other conditions that might arise in a reactor.

Nonplanar 3D printing and slicing software are being developed and these approaches too can be used in some cases, e.g., to create concave features.

In one embodiment, the technique selected to fabricate in-situ probes was stereolithography, more specifically, low force stereolithography (LFS)™ from Formlabs, Somerville Mass., along with a with a biocompatible photopolymer resin system.

Many of the devices described herein can be printed using biocompatible polymeric materials (plastics) such as, for example, methacrylate-based resins, poly(lactic acid), polypropylene, acrylonitrile butadiene styrene (ABS), polyphenylsulfone (PPSU, PPSF), perfluorooctanoic acid (PFOA) (conjugate base perfluorooctanoate), also known as C8, polyamide, polyethylene terephthalate (PET or PETG), polyether ether ketone (PEEK), polycaprolactone (PCL), polycarbonate and others, as known in the art or as developed in the future.

Factors that may be considered in selecting a particular material include, for instance, its inertness. Often, the chosen material will be non-biodegradable. Also desirable are materials that form surfaces that are poor substrates for (or could even inhibit) the adherence of cells or other reactor constituents. For some applications, the material does not substantially affect cell viability. For others, the material is a 3D printable resin that is biocompatible and presents sterilization options.

In one embodiment, the printing material was a biocompatible, autoclavable photopolymer resin available from Formlabs Inc. (Somerville, Mass.) under the name Surgical Guide Resin. The resin is classified as a Class 1 Medical Device and has been evaluated in accordance with ISO 10993-1:2018, ISO 13495:2016, and ISO 14971:2012.

Other embodiments employ metal 3D printing. For instance, stainless steel, a material not amenable to gamma radiation sterilization or single use applications, can be employed to fabricate reusable probing devices, relying on additive manufacturing techniques such as known in the art or developed in the future.

An exemplary 3D printing process starts with 3-dimensional drawings or sketches of the probing device or component thereof. These can be prepared using a computer-aided design (CAD) software package, e.g., from SolidWorks Corp., Dassault Systemes, or another CAD software package that can produce an .STL file (in particular one that is compatible with the 3D printing software employed, e.g., PreFrom from Formlabs Inc.). Onshape from Onshape Inc. is another currently available option.

The 3D sketch can then be sliced into two-dimensional layers using suitable software and a desired slice resolution. For example, a slicing program such as PreForm (from Formlabs Inc.) can print at a layer resolution of from 150 micron to 25 microns. The shells (i.e., the outlines or outer perimeters of each layer) can be customized in some situations.

Inserted and/or maintained in a bioreactor, many of the devices described herein (or components thereof) are used to monitor processes in real time, in-situ, in a nondestructive manner. One such device can incorporate elements for interrogating as well as elements needed to analyze the contents of a bioreactor, e.g., in the NIR region of the electromagnetic spectrum. In one illustrative example, the sample is not withdrawn from the reactor. Rather, an interrogating beam of electromagnetic radiation is introduced into the reactor and traverses a pathlength within the reactor medium, in a sample detection gap formed in the probe. Transmitted radiation reaches an internal or an external photodetector and is analyzed by a controller.

In one arrangement, a light beam is launched straight out of a fiber and/or a free space link, through a sample gap, with the transmitted light impinging onto an internal photodetector, with the detector cables running up the length of the probe. Such an arrangement can improve the quality of the analysis, e.g., by providing increased or even maximum signal to noise ratios. In comparison to using a return fiber optic cable leading to a photodiode, often external to the reactor, this arrangement relies on the signal to noise ratio (SNR) of the electrical cables, which generally is superior to fiber optics.

Designs that direct the illuminating light through a free space (where the fiber optics is used externally to bring the light to a collimator at the top of an in-situ probe, after which the light propagates through the free space rather than through a fiber optics) and that assemble all components, including the photodetector, internally to (or within the probe) can be particularly useful when wishing to operate in single mode (SM) or polarization maintaining (PM) mode. For multimode operations, fiber optics can be used to bring light into, as well as out of the probe. Instead of having the transmitted light reaching an internal detector and transmitting an electrical signal out of the reactor, here the transmitted light is propagated through an optical fiber along the length of the probe, to be analyzed externally, using, for instance, a detector at the top of the probe.

Any number of devices can be manufactured additively. Some illustrative reactor probes, for instance, are described in U.S. patent application Ser. No. 17/030,032 to Hassell et al., filed on Sep. 23, 2020, published as U.S. Patent Application Publication No. US 2021/0088433 A1, with the title In-Situ Probe; U.S. patent application Ser. No. 17/006,172, to Hassell et al., filed on Aug. 28, 2020, published as U.S. Patent Application Publication No. US 2021/0062133 A1, with the title Device and Bioreactor Monitoring System and Method; U.S. patent application Ser. No. 17/337,055, to Hassell et al., filed on Jun. 2, 2020, published as US Patent Application Publication No. 2021/0371785, with the title Disposable Cell for In Situ Monitoring Probe. The entire contents of these applications are incorporated herein by this reference. While nothing precludes relying on 3D printing to prepare simple reactor probes, techniques described herein are particularly useful when fabricating devices of intricate or complex geometries.

Being relatively inert and biocompatible, stainless steel is very attractive in the manufacture (generally by subtractive machining, removing material to generate the desired object) of probes for bioreactors. Stainless steel probes, as well as other conventional probes fabricated from opaque materials, that rely on passing light through a sample, however, require openings, mountings, and/or other features for supporting or attaching the optical elements for the specific analytical technique being employed. Windows, for example, are selected for their light transmission properties in a desired wavelength region. In submersible applications, windows (or other optical components) also serve as a seal. Watertight mountings are often needed, e.g., to prevent transfer of reactor constituents into the probe and/or that of contaminants from the probe into the reactor.

Devices described herein (or some of their components) also are designed to be submerged in the reactor medium. Specific embodiments, however, obviate the use of windows, thus reducing or eliminating the complexities and difficulties associated with establishing watertight fittings and problems raised by potential leaks. In these embodiments, traditional windows are replaced by transmission areas (also referred to herein as "ports", "sections", "layers" or "regions" configured to allow sufficient light to pass through and still be detected on the other side. 3D printing, often in conjunction with a specific printing material, can generate transmission sections that are an integral part of the device (or component thereof) and that can be, for instance, 500 microns ($\mu$m) or thinner, e.g., within a range of from about 100 to about 200, from about 100 to about 300, from about 100 to about 400, from about 100 to about 500 $\mu$m; or from about 200 to about 300, from about 200 to about 400, from about 200 to about 500 $\mu$m; or from about 300 to about 400, from about 300 to about 500 $\mu$m; or from about 400 to about 500 $\mu$m. A lens located before and/or after each window can also be printed.

3D printing materials that can further enhance such integrated transmission sections can be selected based on light transmission properties in a specific wavelength region of the electromagnetic spectrum. In some cases, printing materials employed are devoid of pigments or other additives that might interfere or block light transmission. In one example, the resin used was suitable for NIR absorption measurements.

The device fabricated by 3D printing can be configured for monitoring a process in-situ, without withdrawing a sample from the reactor. An interrogating beam of electromagnetic radiation is introduced into the reactor and traverses a pathlength formed within the reactor medium; transmitted radiation reaches a photodetector and generates an electrical signal that is conveyed and analyzed externally. In some embodiments, 3D printing is used to form a gap suitable for a specific electromagnetic region, providing, for instance, a pathway that could be ranging from long, e.g., within a range of from about 5 to 10 mm (for UV) to short, e.g., of about 100 μm (for mid-infrared).

In one illustrative configuration, the device includes a 3D printed tubular body and a 3D printed tip section at the end of this body. The tip section has a sample detection region defined by an optical transmission port and an optical detection port. To monitor a reactor, the sample detection region is submerged in the reactor medium. An interrogation light beam emerges from the optical transmission port and travels towards the optical detection port, being modified or modulated by analytes present. It reaches the optical detection port and eventually a photodetector housed in the tip section. At least one of the two ports can be an integral part of the 3D printed tip section, typically formed as a very thin layer in an area traversed by light as the light beam enters and/or exits the sample detection region. The photodetector is supported by an optics mount which is fabricated by 3D printing in one implementation. The mount can be designed to support lenses and/or other optical components used in the spectroscopic analysis. In many implementations, the tubular body, the tip section and the optics mount are detachable from one another. They can be fabricated as individual components.

FIGS. 1 through 4 is probe 100, configured for placing and/or maintaining a sample detection region 112 within a bioreactor. As seen in these figures, the sample detection region 112 is located at a tip section 114 of probe 100 and can be shaped as an indentation, recess or gap formed in the tip section. When submerged in the reactor medium, the thickness of this gap corresponds to the sample pathlength traveled by the interrogation light employed.

Probe 100 also includes tubular body 116, cylindrical for example, and having, in some implementations, an outer diameter of 12 millimeters (mm). Tubular body 116 defines an isolated optical channel 118, supporting a free space optical path 120 for propagating an electromagnetic beam to the sample detection area 112, without using fiber optics. Tubular body 116 also includes a detector wire channel 122. In specific embodiments, the tubular body 116 and fitted tip section 114 are detachable from one another. One and preferably both are fabricated by 3D printing.

At its upper end 124, tubular body 116 connects to fiber port mount 126, which can be 3D printed. The fiber port mount is provided with fiber optical port adjuster 128, for receiving optical fiber 130. Signal cable and connector 132, can be attached to or detached from the fiber port mount at detector signal receptacle 134.

Since many bioreactor headplates are equipped with ports for receiving various fittings which can be screwed in, fitting 136 and EPDM rubber O-ring 138, or another suitable arrangement, provide a seal onto the headplate at the top of a bioreactor. In more detail, fitting 136 can be a PG13.5 fitting having the standard thread typically used on bioreactor headplates. The EPDM O-ring 138 creates the seal between the headplate and tubular body as fitting 136 is tightened. A spacer such as a Teflon washer (not shown in the drawings) can be added to ensure sealing on certain bioreactor headplates that may have a deeper threaded section for the PG13.5 fitting.

The dimensions of tip section 114 and the tube body 116 can be selected according to the size of the reactor. In many situations, the longitudinal distance between the fitting 136 and the sample detection region 112 of the tip section 114 is configured to expose detection area 112 to the reactor medium being monitored and specifically a portion of that medium that is representative of the entire medium in the bioreactor, rather than possibly unmixed medium along a wall of the reactor. In one illustrative example, the distance between the fitting 136 and the sample detection region 112 is at least 1 centimeter (cm), e.g., at least 2, 3, 4, 5, 10, 15, 20, 25, 30, 35, 40, 45, 50, 55, 60, 65, 70, 75, 80, 85, 90, 95 or 100 cm. Tip section 14 can be smaller, for miniaturized reactor designs, for instance, or larger, for some industrial scale applications.

Obtaining the desired length can be implemented using a single 3D printed tubular body 116 of the appropriate dimensions, or by joining two or more tube segments. Easily produced by 3D printing, these segments can be assembled to define a free space optical path and a detector wire channel, essentially as described above. O-rings or other suitable means can be used to attach the segments in a fluidically sealed arrangement.

Figure 3:
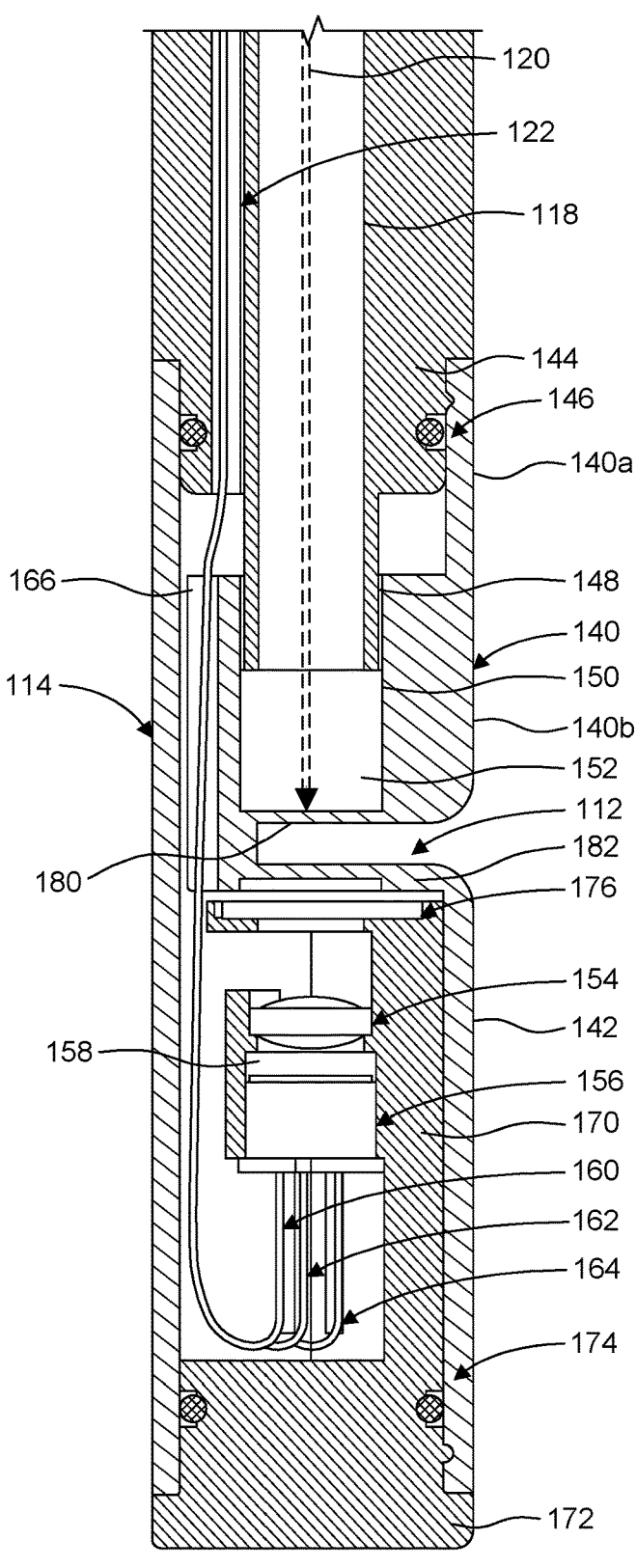
FIG. 3 is a cross-sectional view of the tip section of the in-situ 3D printed probe of FIGS. 1 and 2.

As seen in FIG. 3, tubular body 116 is configured for being joined or attached to tip section 114, which includes a first (upper) portion 140 and a second (lower) portion 142. In more detail, tubular body 116 includes transition region 144, having a narrowed diameter dimensioned to fit the inner surface of lip 140a, recessed in first portion 140 of tip section 114. A leak free assembly of the two parts can be obtained by using an EPDM rubber O-ring 146 or another suitable arrangement.

The diameter of transition region 140 is further reduced to form end 148, in tubular shape, for instance. This narrowing configuration cuts through and terminates detector wire channel 122, while continuing to support the free space optical beam path 120. End 148 fits inside a hollow channel 150 formed in region 140b of tip section 114. Free space optical path 120 of tubular body 116 can continue with free space link 152 in this hollow channel 150.

Lower portion 142 of tip section 114 is partially separated from the upper portion 140 by a recess, gap or indentation which defines the sample detection region 112. Lower portion 142 houses optical elements, such as, for instance, lens 154 used for conditioning, i.e., focusing or collimating, the light transmitted through the sample detection region 112; and photodetector 156, e.g., a photodiode. The photodiode can be arranged behind photodiode window 158. The photodiode provides a three-pin photodiode connector for photodiode cathode wire 160, ground wire 162 and anode wire 164. These wires are directed through lower portion 142 to and through detector wire channel 166 formed in region 140b of tip section 114. The length of the wires employed can be selected based on the overall dimensions of the probe (which, as described above, will depend on the size of the reactor being monitored).

Relative to an alternative arrangement in which light that has passed through the sample detection region 112 is transmitted, via fiber optics, to an external photodiode detector, an arrangement which includes the detector (photodiode 156 in FIG. 3) as part of the tip section and thus transmits an electrical signal (e.g., to controller 200 in FIG. 1) can lead to improvements in the SNR.

The optical components (e.g., lens 154) and photodiode 156 are supported by optics mount 170, which can be 3D printed. Optics mount 170 is configured to fit within the lower portion 142 of tip section 114. Plug section 172 of optics mount 170 and EPDM O-ring 174 (or another suitable arrangement) protect photodiode connector and wires in leak-tight fashion and isolate the interior of the tip section 114 from the reactor medium. Window 176 sits at the top of optics mount 170 and allows light to enter the optics mount and continue through lens 154 to photodetector 156.

The tubular body, the tip section and/or other parts of the probe, e.g., the optics mount, can be prepared from the same or from different 3D printing materials, using the same or different 3D printing methods. In one embodiment the layers of a particular probe component are created orthogonally to the free space optical path 120 using a commercially available 3D printing system such as, for example, Form 3B from Formlabs (which also offers printing with a biocompatible resin).

In general, the 3D printing process involves creating the part from three-dimensional models. The mathematical representations of surfaces can be generated using computer-aided design (CAD) software or developed from 3D scan data. Files such as STL (Standard Triangle Language also known as Standard Tessellation Language), OBJ, etc., including the parameters (3D coordinates, texture maps, and so forth) needed by the 3D printer, can be exported and opened by a suitable 3D image editing program supported by the 3D printing system employed. A typical 3D printer also includes software for specifying print settings and for slicing the digital model into layers that represent horizontal cross-sections of the part, tubular body 116 of FIGS. 1-4, for instance.

Preparing the printing system for the printing operation typically involves selecting parameters such as specific orientations, support structures (if needed), layer height, material, etc. Once this setup is completed, the software sends the instructions to the printer, via a wireless or cable connection. The printing process itself may rely on curing liquid resin into hardened plastic, using a laser (SLA), or fusing small particles of polymer powder at high temperatures (SLS) to build the part.

To replace the need for conventional windows that transmit light and also isolate the interior of the probe from the reactor medium, the 3D printer is instructed to form transmission port 180 as a layer thin enough to pass sufficient light into sample detection region 112 to conduct meaningful measurements. In specific implementations, the thickness of transmission port 180 is within a range of from about 100 to about 500 microns, as described above. Detection port 182 can be formed across the sample detection region 112, as a layer at the top of lower section 142. Detection port 182 can have the same or a different thickness relative to transmission port 180. As with the layer forming transmission section 180, detection section 182 is thin enough, e.g., within a range of from about 100 to about 500 microns, to allow sufficient transmitted light for performing meaningful absorption analysis. When submerged in the reactor medium, the distance between the outer surfaces of ports 180 and 182 (which face one another) defines the sample pathlength travelled by the light beam employed. At least one of ports 180 and 182 can be substituted by a traditional window made of glass, for instance, that transmits at the wavelength(s) of the light beam. In such a case, the 3D printer can be instructed to create openings (free space) to be fitted with conventional windows.

Once printed, the device or component thereof can be further processed. A common post process involves washing the part with a suitable solvent to remove leftover chemicals. Surface finishing and/or other steps can be performed on the 3D printed device or component thereof For many applications, device 100 (or its components) is sterilized, using gamma radiation, as known in the art. This step can be part of the probe manufacturing process, in the form of a post processing operation, for example. If configured for single use, device 100 does not require autoclaving or the auxiliary parts (caps, plugs, etc.) that often are used to autoclave stainless steel construction. Also obviated are assembly and disassembly steps related to autoclave sterilization.

Figure 4:
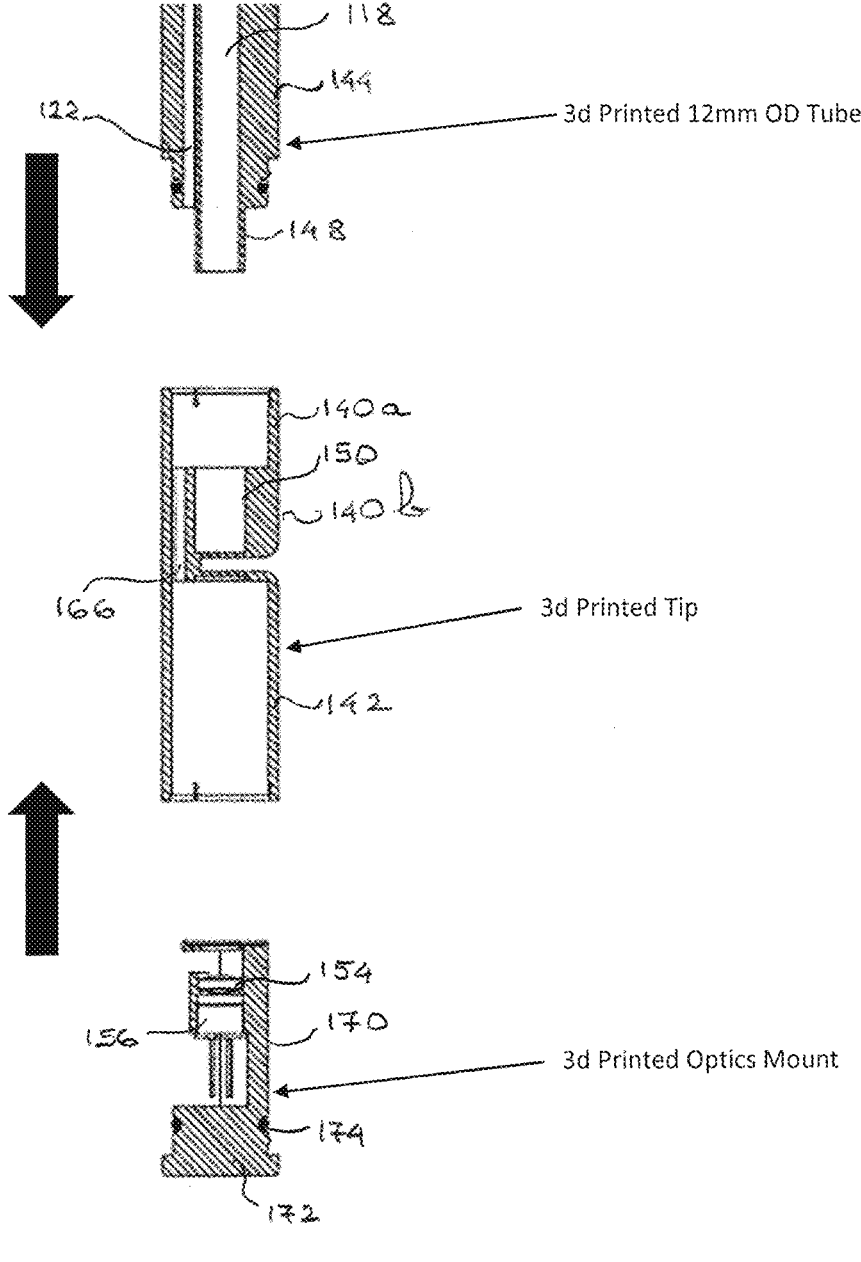
FIG. 4 is a diagram illustrating the assembly of the probe of FIGS. 1 and 2.

To monitor a process, in a bioreactor, for instance, the components of device 100, typically fabricated additively, as individual pieces, can be assembled as illustrated in FIG. 4. Transition region 144 and end 148 of tubular body 116 are inserted, respectively, in lip 140a and region 140b of first portion 140 of tip section 114. Optics mount 170 is inserted in the second portion 142 of tip section 114. Leak-free attachments and electrical connections are made as described above.

For analysis, a beam of electromagnetic radiation (e.g., in the NIR region), generated, for instance, by a tunable laser is brought into the 3D printed device 100 via optical fiber 130 and fiber optic adjuster 128. The beam propagates in the direction of the arrow (FIG. 3), along free space optical path 120, within isolated optical channel 118, without the need for optical fiber. The beam passes through transmission port 180, then through sample detection region 112, where some of the wavelengths may be preferentially absorbed. The transmitted beam passes through transmission port 182, window 152 and lens 154, reaching the photodiode window 158 and photodiode 156. The photodiode signal is transmitted though wires housed in channels 166 and 122, exits the 3D printed device 100 through signal cable and connector 132 and is directed to an analyzer, e.g., controller 200 (FIG. 1) or a component thereof.

Controller 200 monitors the response of the photodiode 156 and can resolve the absorption spectra of the sample by monitoring the spectral scanning of the tunable laser over its scan band relative to the time-response of the photodiode 156. Generally, the tunable laser or tunable laser system sweeps its narrow band emission over some region of the electromagnetic spectrum such as the NIR and/or SWIR regions, or portions thereof. In some embodiments, the laser is controlled by controller 200.

In one example, the in-situ probe 100 is employed to monitor and/or control a bioreactor automatically, using a suitable arrangement or system. The arrangement or system employed includes a controller, e.g., controller 200 in FIG. 1. Part of controller 200 is a narrow band tunable light source 201 such as a tunable laser to interrogate specific wavelengths or wavelength bands of the electromagnetic spectrum to perform absorption spectroscopy on the contents of a reactor. The controller 200 also includes a single board computer, in one example, for monitoring the response of the photodiode 156 as a function of the instantaneous wavelength of the tunable laser in order to resolve the absorption spectrum of the materials in the sample detection region 112.

In operation, the laser source 201 spectrally sweeps through a portion of the wavelength band such as from 780 nanometer (nm) to 2500 nm of the electromagnetic spectrum, or a portion thereof. This light is supplied to the device 100 and is directed through the isolated optical channel 118 as a free space beam and passes through sample detection region 112. Transmitted light is directed through optical elements and the signal from photodetector is analyzed as described above.

Desired scanning parameters can be selected and scanning can be conducted according to a suitable scanning program. In one example, the frequency of measurement is set to about every 5 minutes. In many implementations, the sampling is repeated with any desired frequency over any desired time period. For example, sampling is repeated (e.g., at a few minute-intervals) to monitor the entire reactor process (e.g., for minutes, hours, days, a week, two weeks, three weeks or longer).

The in-situ 3D printed device can be used to monitor stir tank reactors, rocking reactors, flow system reactors or other types of other reactors.

Figure 5A:
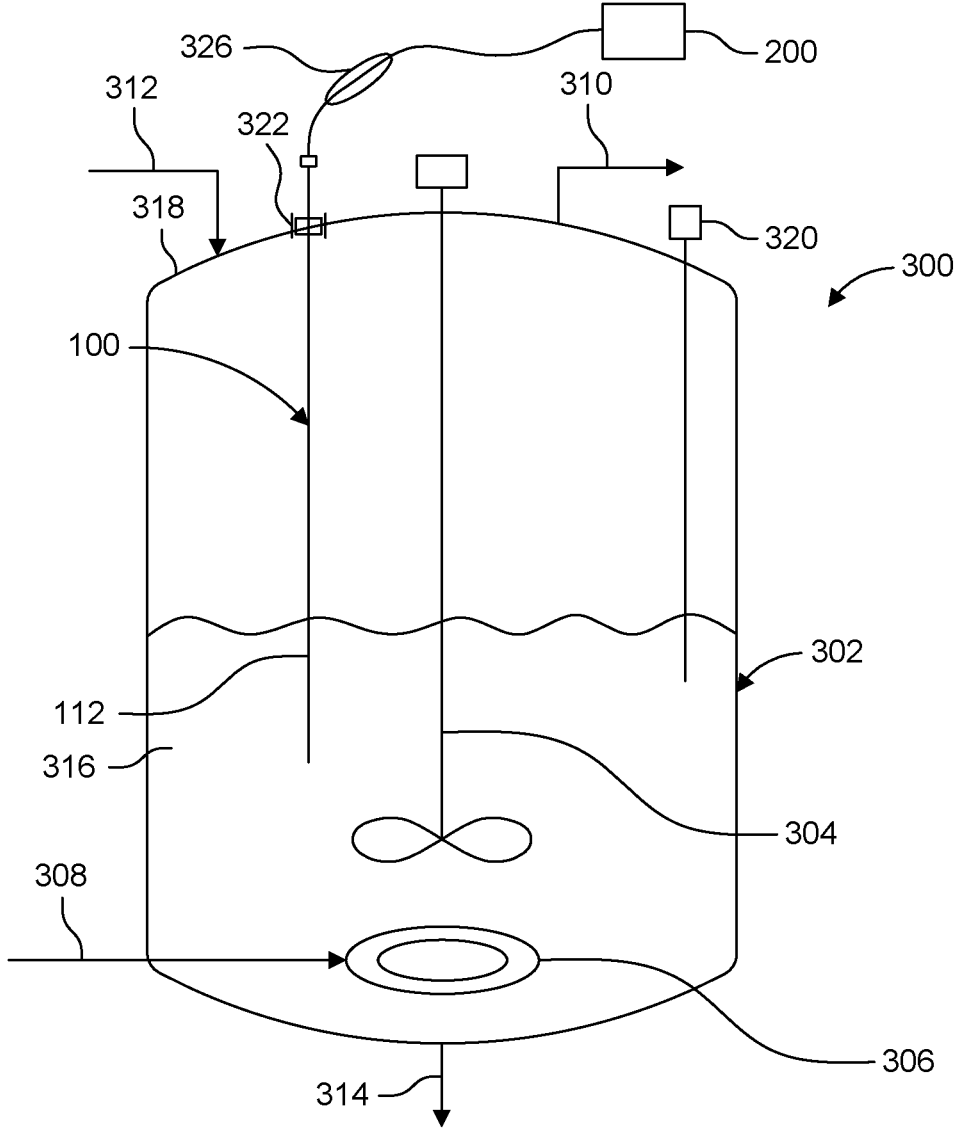
FIG. 5A is a diagram of a system in which a stir tank reactor is monitored by an in-situ 3D printed probe controlled by a controller.

Shown in FIG. 5A, for example, is system 300 including a bioreactor 302, monitored by a 3D printed in-situ probe such as, for instance, probe 100 in FIGS. 1-4 and controlled by a controller 200. For illustrative purposes, the reactor 302 in FIG. 5A is a stirred tank reactor, which can be a continuous, semi-continuous or batch type. Stirred tank reactor 302 is provided with a motorized impeller 304 and sparger 306. Air is supplied to the sparger via conduit 308, while gas exits the reactor through conduit 310. Conduit 312 is used to supply ingredients to the reactor, while product can be collected via conduit 314.

Culture medium 316 is monitored by a 3D in-situ probe, e.g., device 100 (FIGS. 1-4), which is provided with a sample detection region 112 and is secured to a port 322 in the bioreactor headplate 318, using fitting 136 (FIG. 1). In operation, a light beam generated by the laser in the controller 200 and electrical signal from the photodiode 156 are transmitted to and from the probe, e.g., via a wire harness arrangement 326. Other process parameters (pH, oxygen levels, etc.) can be monitored using one or more probes 320 which can be controlled by controller 200 or independently of controller 200.

Figure 5B:
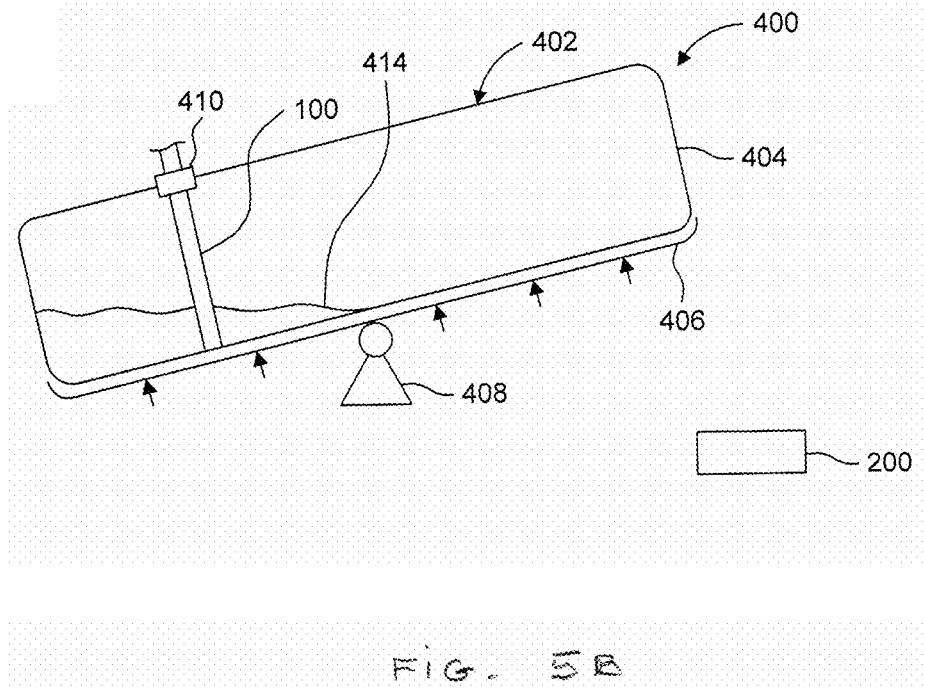
FIG. 5B is a diagram of a system in which a rocking bioreactor is monitored by an in-situ 3D printed probe controlled by a controller.

Shown in FIG. 5B is system 400 in which 3D printed device 100 is inserted to monitor and/or control a rocking bioreactor 402. The rocking bioreactor includes bag 404, supported on a heated plate 406. A typically gentle rocking motion is generated by motorized base 408. The in-situ probe 100 (FIGS. 1-4) is inserted via top bioreactor port 410. Analysis of the bag contents 414, can be performed using controller 200, essentially as described above. For single use applications, bag 404 and device 100 can be discarded together, at the end of the run, for instance.

Figure 6A:
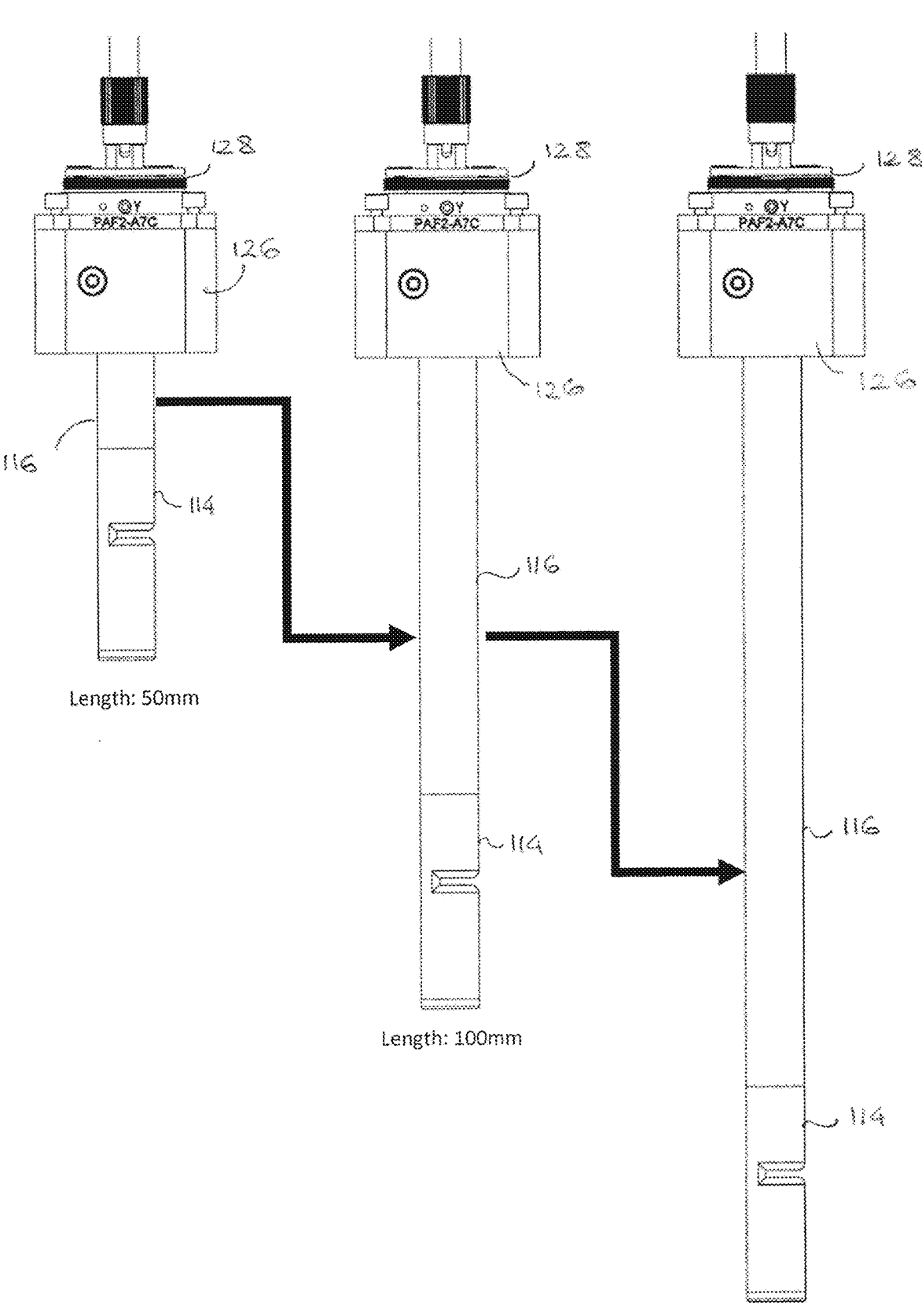
FIG. 6A is an illustration of the options offered by 3D printing when fabricating a probe having a desired length.
Figure 6B:
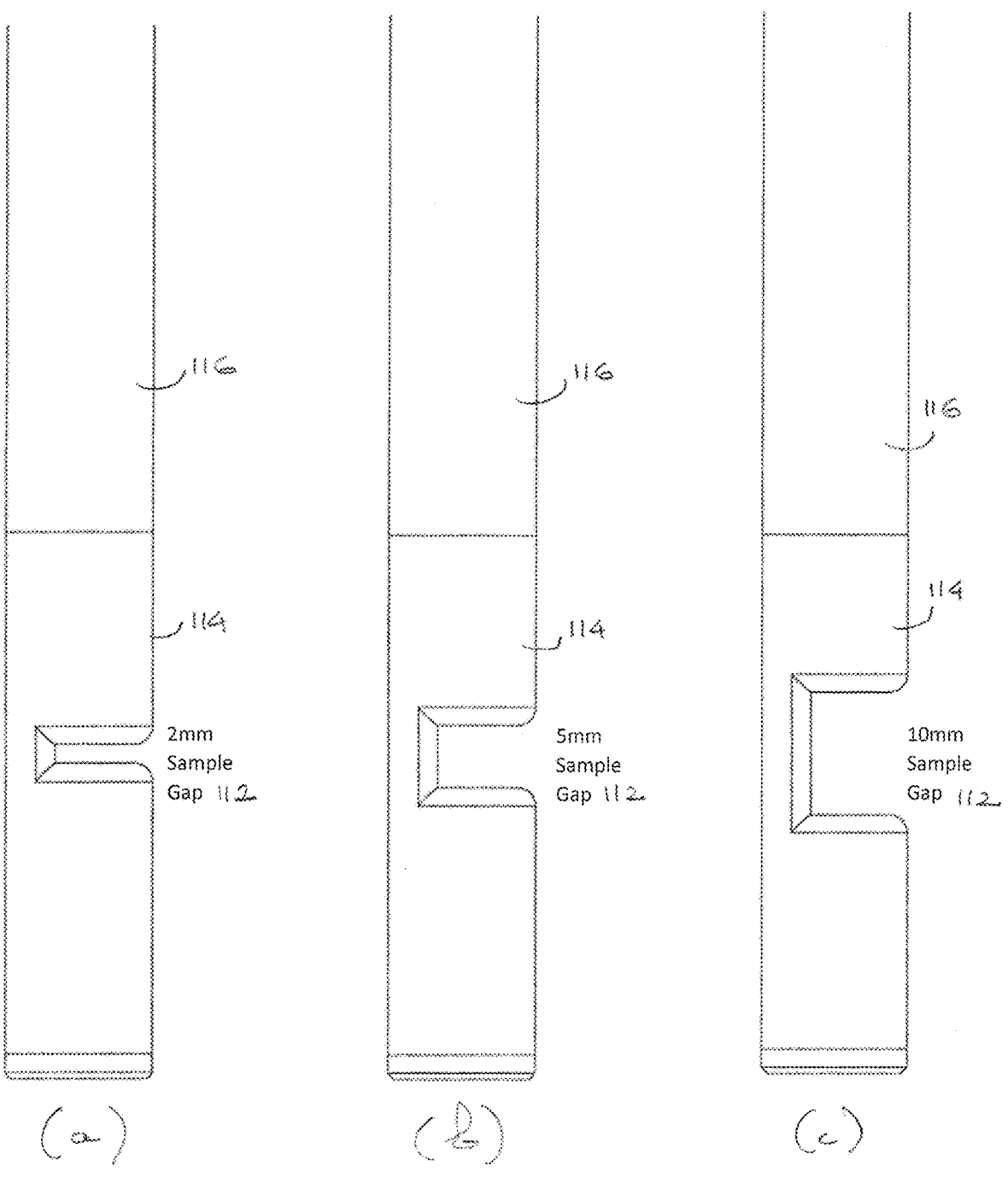
FIG. 6B is an illustration of the options offered by 3D printing when fabricating a probe having a desired sample detection pathlength.

Probing devices have many other applications. Thus, using 3D printing, a probe such as shown, for example, in FIG. 1, can be fabricated according to reactor specifications, constituents being analyzed, detection techniques employed and so forth. FIGS. 6A and 6B illustrate the flexibility and versatility brought about by 3D printing.

Shown in FIG. 6A, for instance, are versions of the in-situ probe 100 in which tubular body 116 is fabricated to provide 3 illustrative lengths, doubling the relatively short length of 50 millimeter (mm) in version (a) to 100 mm in version (b), then to 200 mm in version (c). Probes that can be easily fabricated to a desired length can be easily adapted to various reactor designs and/or dimensions. As discussed above, the lengths in probes (a), (b) and (c) also can be obtained by using, respectively, one or assembling two or more separate 3D printed segments of 50 mm each. Segments of different lengths also can be employed.

FIG. 6B presents three versions of tip section 114, version (a) having a sample detection region defining a relatively short pathlength (2 mm); in versions (b) and (c) the pathlength is 5 mm and 10 mm, respectively. Options for easily preparing probes having a desired pathlength increase access to different detection techniques, matching, for instance, the type of electromagnetic radiation employed to an optimized pathlength.

Figure 7:
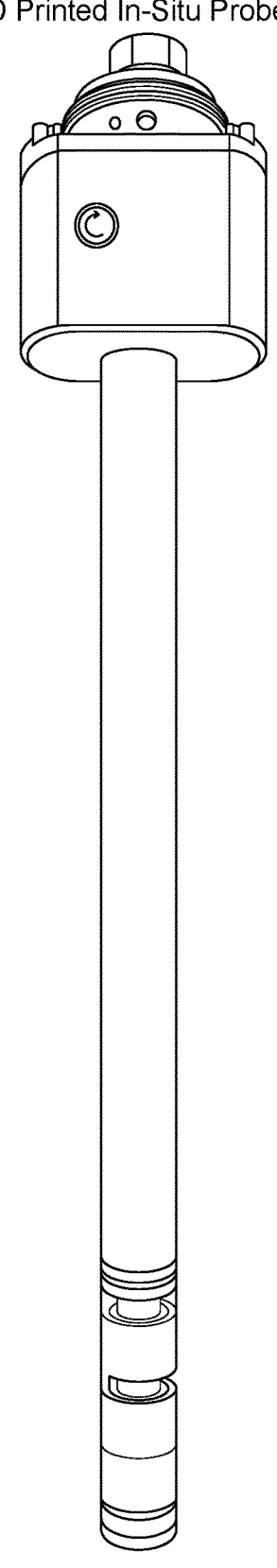
FIG. 7 is a color photograph of the in-situ probe of FIG. 1.
Figure 8:
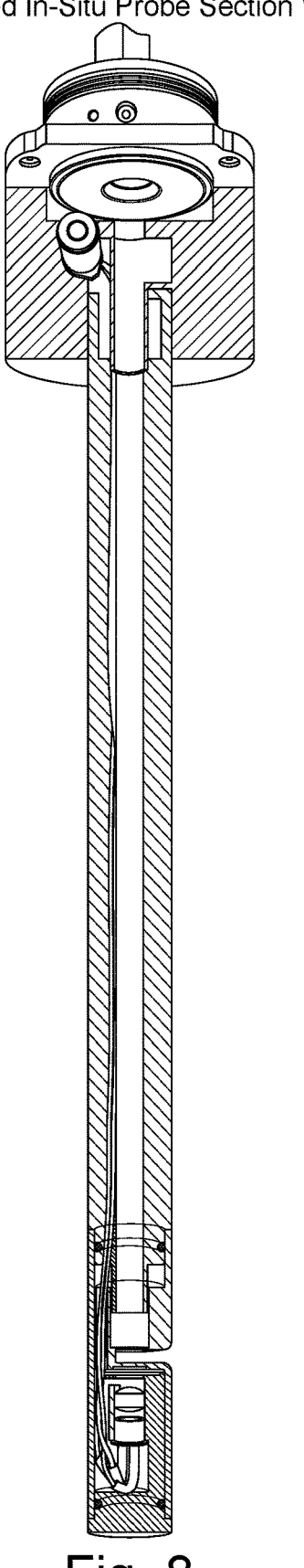
FIG. 8 is a color photograph of the vertical cross section of FIG. 2.
Figure 9:
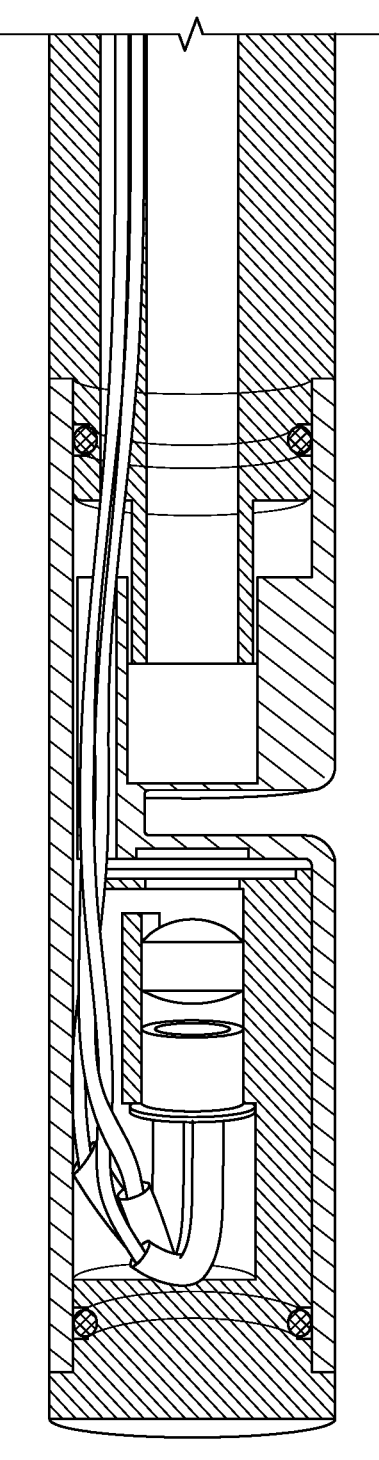
FIG. 9 is a color photograph of the tip section of FIG. 3.

FIGS. 7 through 9 are color photographs of a 3D printed probe or 3D printed components thereof according to embodiments of the invention.

Additive manufacturing techniques can be applied or adapted to fabricate other probes or components thereof. In many embodiments, traditional windows generally employed with stainless steel construction are replaced by thin (e.g., 100 to 500 microns) 3D printed areas that allow interrogation and/or transmitted light to pass through, essentially as described above. In one implementation, 3D printed in-situ probes replace stainless steel probes described, for example, in U.S. patent application Ser. No. 17/030,032 to Hassell et al., filed on Sep. 23, 2020, published as US 20021/0088433 A1, with the title In-Situ Probe and incorporated herein by this reference in its entirety.

Further illustrations of specific in-situ probes that can be manufactured additively are described with reference FIGS. 10 through 13.

Figure 10:
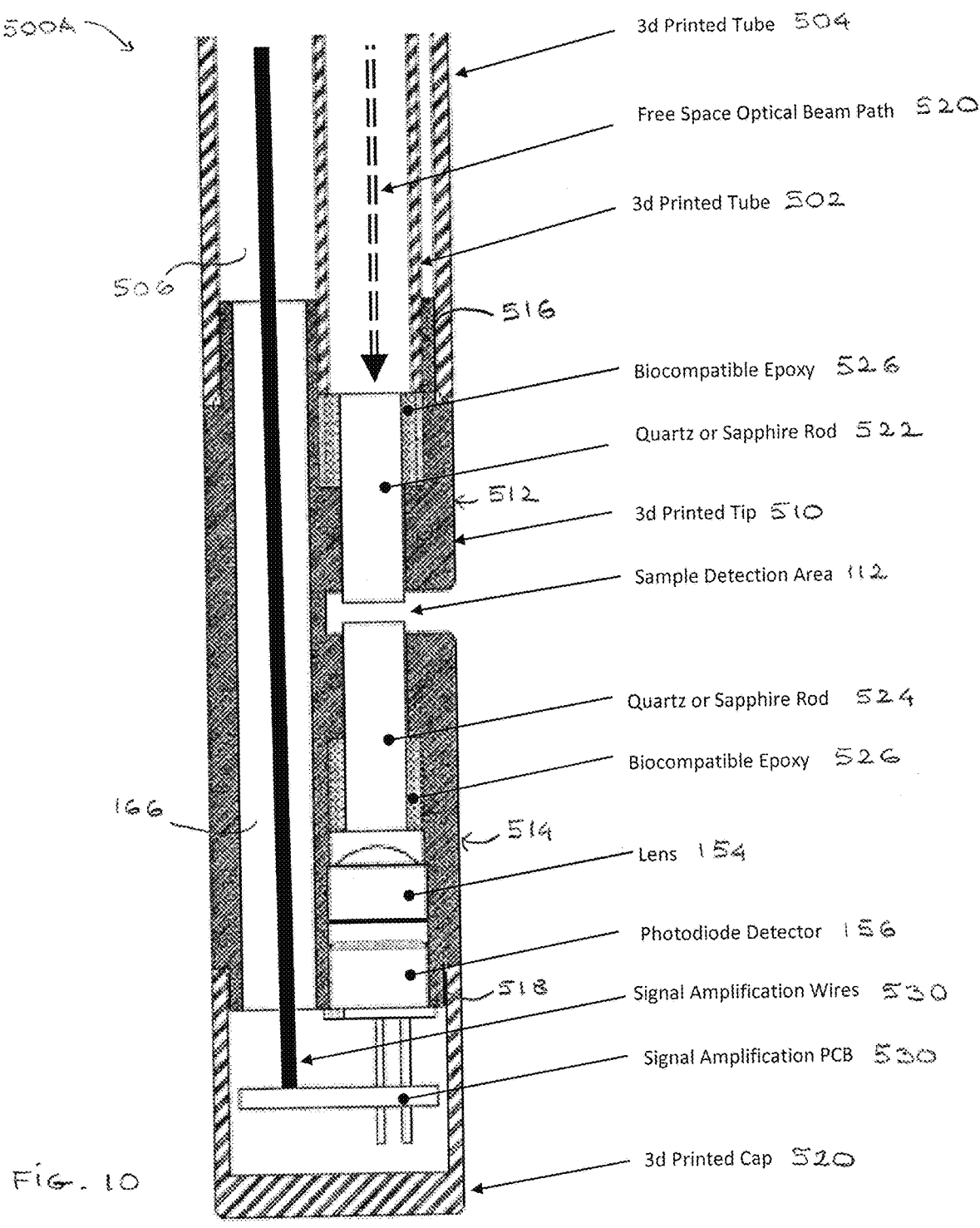
FIG. 10 is a vertical cross section of a lower part of an in-situ probing device fabricated by 3D printing and equipped with circular rod windows.

As with device 100 (FIGS. 1-3), in-situ probe 500, a lower region of which, 500A, is being shown in FIG. 10, also relies on propagating electromagnetic radiation along a free space optical beam path 520. While in probe 100 light travels along isolated channel 118, formed in tubular body 116, in probe 500 the free space optical beam path 520 is enclosed in inner tube 502. In the arrangement shown in FIG. 10, inner tube 502 is positioned within outer tube 504 in an off-center geometry. A detector wire space 506 can then be formed between an inner surface of outer tube 504 and an outer surface of inner tube 502. One or preferably both tubes 502 and 504 are 3D printed.

Also formed by 3D printing is tip section 510 which includes upper portion 512 and lower portion 514. The two are partially separated by a recess, gap or indentation which forms sample detection region 112.

In FIG. 10, the outer diameter of most of tip section 510 is the same as the outer diameter of tube 504. At the top end of tip section 510, a narrower rim 516 is designed to fit inside tube 504. At the bottom end of tip section 510 a narrower rim 518 fits inside cap 520, which can be 3D printed as well. Other arrangements for connecting tip section 510 to tube 504 and/or cap 520 are possible. Leak-tight connections prevent reactor media from penetrating inside the probe or contaminants from the probe to spill into the reactor. Remaining device elements can be those described with reference to FIGS. 1-4.

As already noted, a strength of 3D printing is the ease of forming hollow spaces of desired geometries. Thus, tip section 510 is manufactured to generate cavities configured to support light transmitting or light detecting elements. Illustrated in FIG. 10, for instance, are transmission rod 522 and detection rod 524, fitted in cavities defined, respectively, in upper portion 512 and lower portion 514. The rods can be made from quartz, sapphire or another material that functions as waveguide to transmit electromagnetic radiation at a desired wavelength. As for shape, they can have a circular, square, rectangular or any other suitable cross section. The rods can be supported inside the cavity by an adhesive or glue, such as biocompatible epoxy polymer 526. One or both rods can extend into the gap defined between upper portion 512 and lower portion 514, to form a desired sample pathlength. In specific implementations, the distance that an incoming beam travels from leaving rod 522 to reaching rod 524 represents a sample pathlength that can be between 2 mm and 20 mm, such as for example, 2 mm, 5 mm or 10 mm.

Light propagating downward along free space optical beam path 520, passes through rod 522 and interacts with the reactor media in the sample region 112. After having passed through the sample and traversed rod 524, transmitted light is conditioned by lens 154 and received by photodetector (photodiode) 156. The photodiode signal, amplified by signal amplification printed circuit board (PCB) 530, is transmitted via wires 532 through channel 166 (formed in tip section 510) and detector wire space 506, to be analyzed externally, e.g., by controller 200 (FIG. 1).

In some variations, tip section 510 can combine one conventional optical element such as rod 522 or 524, with a 3D printed thin layer described with reference to transmission port 180 or detection port 182 of device 100 (see, e.g., FIG. 3). Implementations that do not require PCB 530 can employ, respectively, photodiode cathode, ground and anode wires 160, 162 and 164 to convey the signal for analysis, e.g., as described with reference to FIG. 1.

Another device that can be replaced by a 3D printed device (obviating, in many cases, the need for conventional windows) is described in U.S. patent application Ser. No. 17/337,055, to Hassell et al., filed on Jun. 2, 2021, published as US 2021/0371785 A1, with the title *Disposable Cell for In Situ Monitoring Probe*, incorporated herein by this reference in its entirety. A light source such as a vertical cavity surface emitting laser (VCSEL) can be disposed within (internal to) the device.

VCSELs can supply superior spectral properties relative to other IR sources such as high-power LED and edge-emitting laser diodes (EELD). For example, NIR VCSELs often present a narrow laser spectrum, a stable wavelength and can be less wavelength dependent on temperature effects. In addition, VCSELs can entail a lower cost to manufacture in a package. Various types of VCSELs are known or are being developed, covering continuous wavelength (CW), quasi CW or pulsed applications. Common available center wavelengths are 830, 976, 1064 nm. Other wavelengths within the range between 630 and 1064 nm can be supplied in some cases. Employing VCSELs in conjunction with a low-cost silicon photodetector may push the desirable wavelength to the long end of the spectrum, in the range between 800 and 900 nm, for example.

Figure 11:
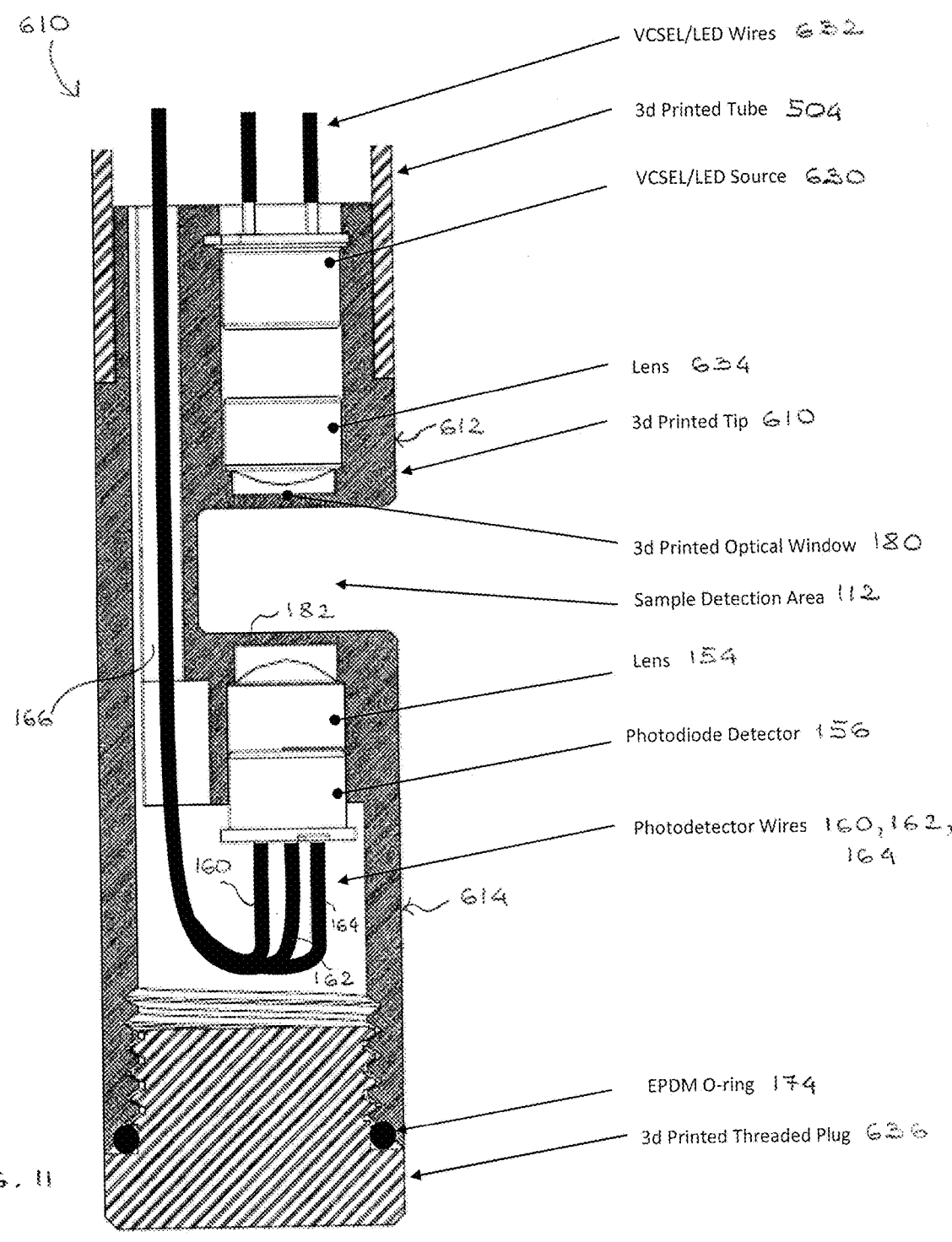
FIG. 11 is a vertical cross section of an in-situ probing device including an internal light source and fabricated by 3D printing.

Shown in FIG. 11 is 3D printed tip section 610 which includes upper portion 612 and lower portion 614, partially separated by a recess, gap or indentation that defines sample detection region 112. Portion 612 attaches to a tube, e.g., tube 504 in FIG. 10, which too can be 3D printed. A hollow cavity, easily formed in portion 612 by 3D printing, is configured to accommodate VCSEL 630 (powered through wires 632) as well as lens 634.

Hollow space, easily "carved" within lower portion 614 by 3D printing, accommodates lens 154, photodiode detector 156 and room for photodiode cathode, ground and anode wires 160, 162 and 164, respectively. The wires pass through channel 166 and connect to a controller such as controller

200 (in FIG. 1) for signal analysis. At the bottom end of lower portion 614, threaded plug 636 and O-ring 174 isolate the interior of the device from the contents of the bioreactor.

At least one conventional window (e.g., made of glass) can be replaced by a 3D printed optical window, formed of a thin layer representing, for example, transmission port 180. A similar 3D printed optical window can be used as detection port 182.

During operation, light generated internally by VCSEL 630 and conditioned by lens 634 traverses sample detection region 112. Transmitted light reaches lens 154 and photodetector 156. The electrical signal from the photodetector is transmitted to be analyzed externally, by controller 200 (FIG. 1), for example.

In specific embodiments, a 3D printed device including an internal light source, e.g., a VCSEL or LED, such as described above, is part of a system that includes a rocking bioreactor (or another type of reservoir) and a controller for conducting the analysis of the fluids in the reservoir. With the device in place, the contents of the reactor can be detected spectroscopically, using, for instance near infrared absorption spectrometry. For some applications the device and, in some cases, also the bioreactor, are designed for single use.

Figure 12:
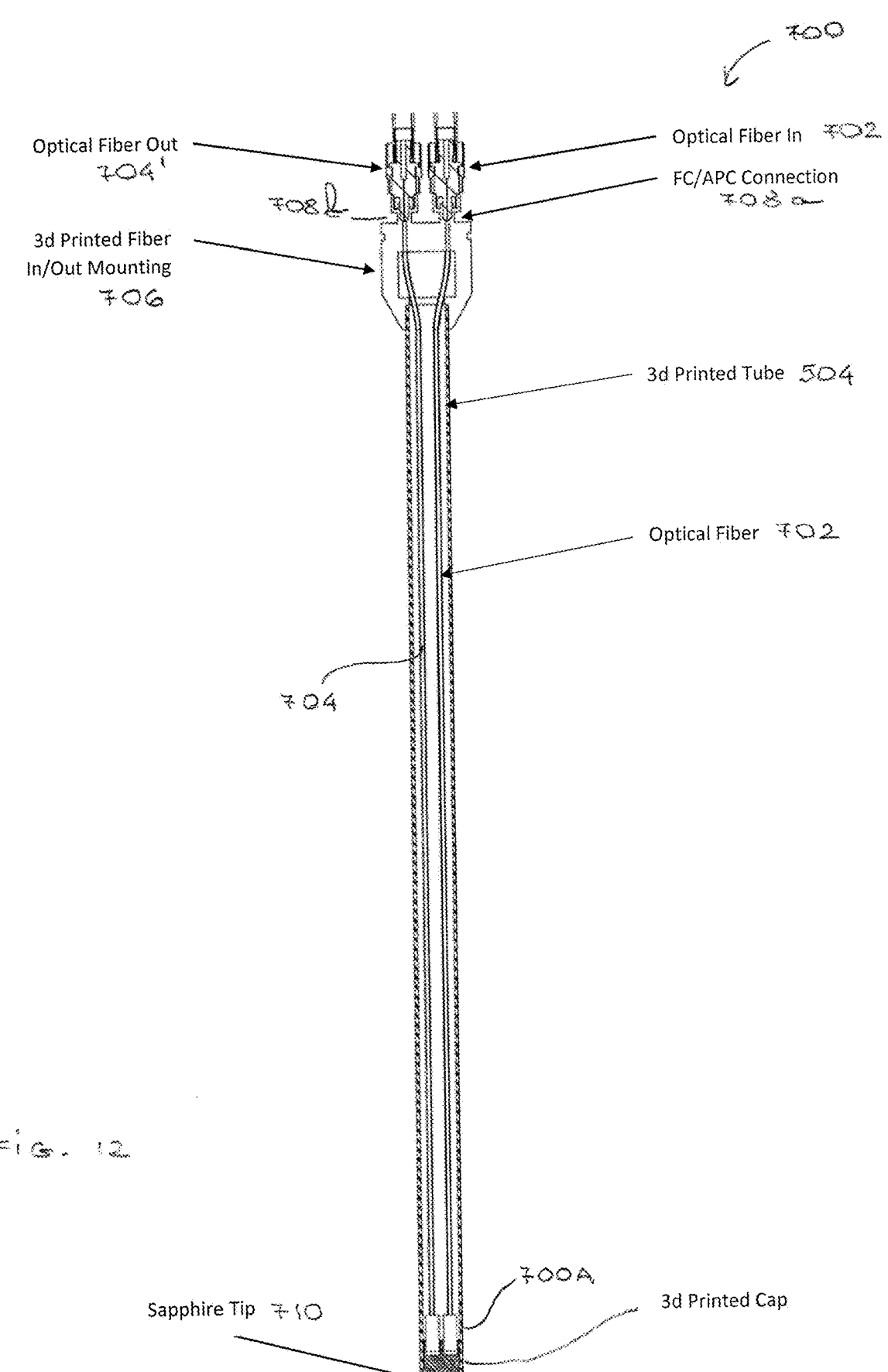
FIG. 12 is a vertical cross section of an in-situ probe including 3D printed components and using optical fibers to introduce illuminating radiation and collect transmitted light.

FIG. 12 illustrates a probing device 700 that relies on optical fibers to transmit electromagnetic radiation in and out of the device. The device includes 3D printed tube 504 and tip 710. Tube 504 houses optical fibers 702 and 704, brought in or out via fiber in/fiber out mounting 706, typically also made by 3D printing. Connections to external optical fibers 702' and 704' can be made by adapters such as, for instance, FC/APC adapters 708a and 708b.

Figure 13:
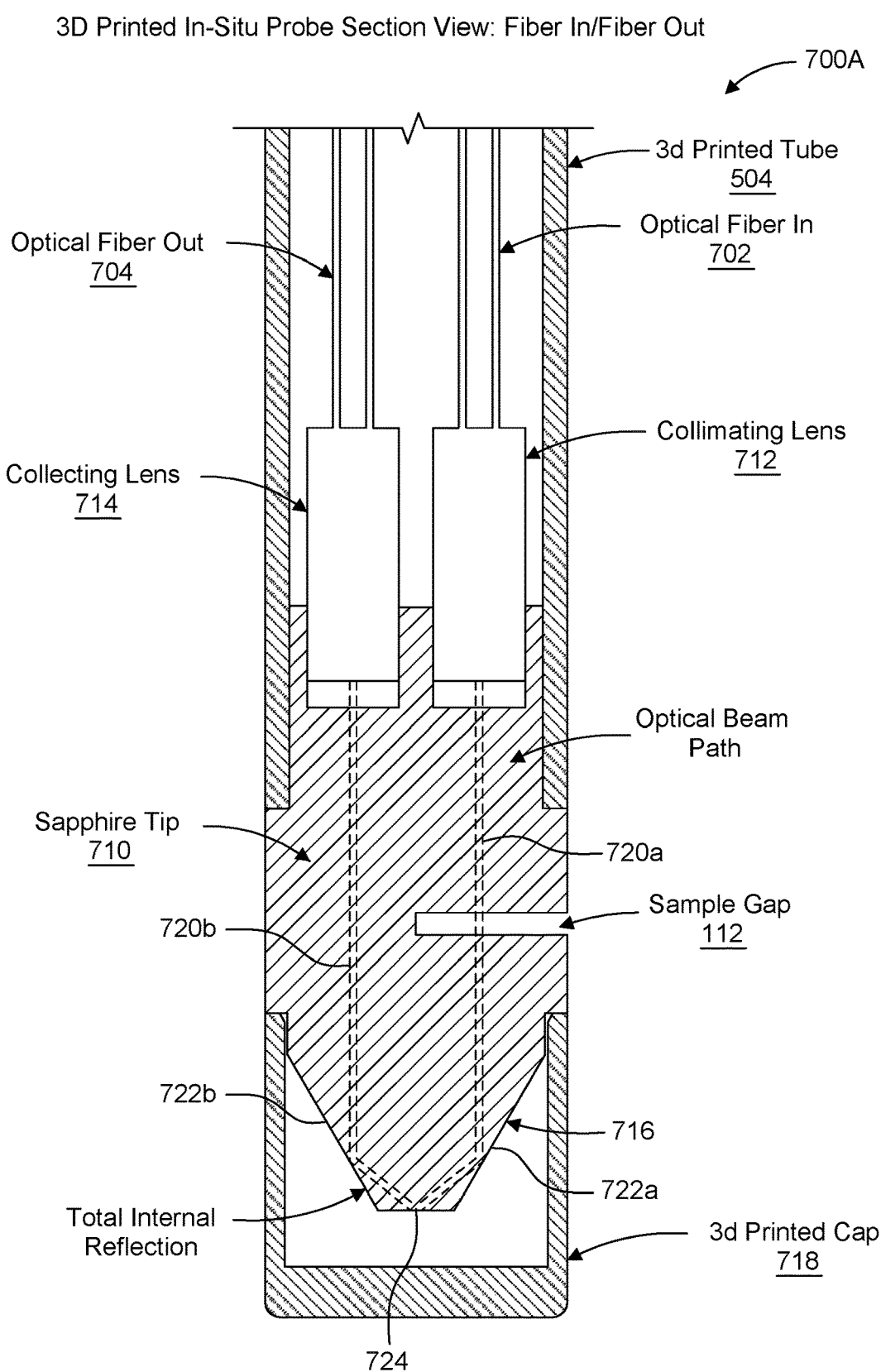
FIG. 13 is a vertical cross section of a tip-including portion of the probe in FIG. 12.
Figure 14:
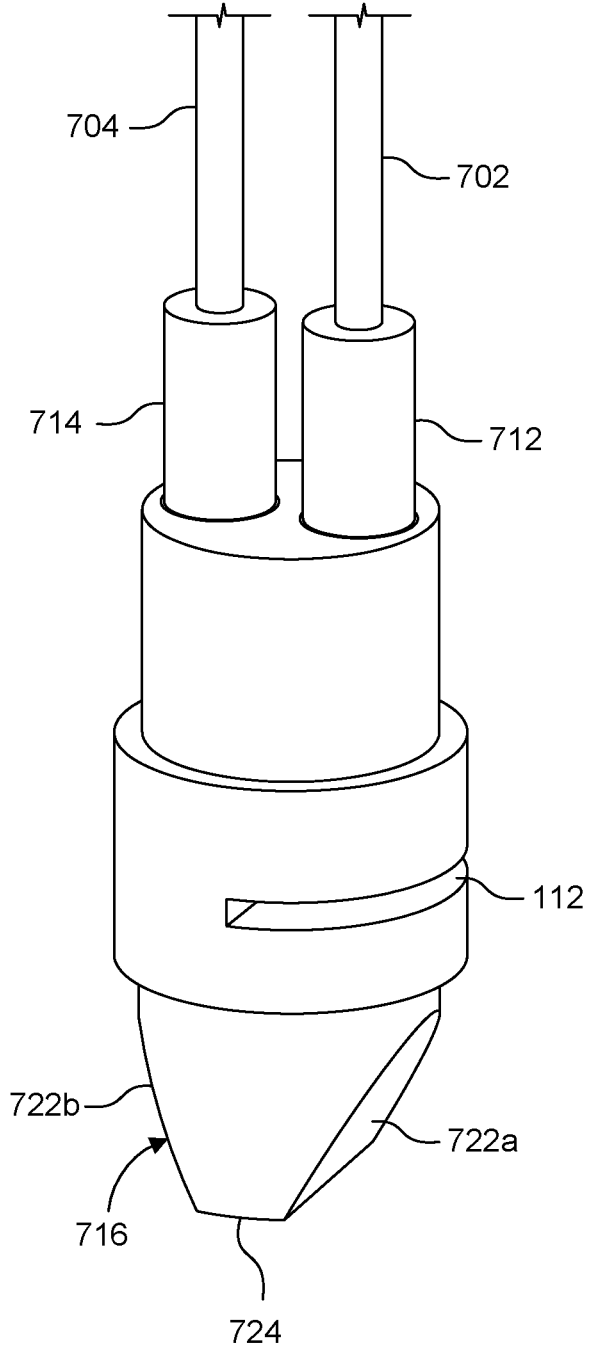
FIG. 14 is an isometric view of a tip section having flat surfaces configured for total internal reflections.

A lower part, 700A, of the device 700 is shown in FIG. 13. It includes tip 710, attached to tube 504 and configured to form a recess, gap or indentation that defines a sample detection region 112. Tip 710 can be configured to support, respectively, collimating lens 712 and collecting lens 714 and/or other optical elements. Made from sapphire or another suitable material, tip 710 has a bottom end 716 designed for total internal reflections. In one implementation, bottom end 716 has an angled section that includes three flat surfaces, namely flat side surfaces 722a and 722b, tapered towards a bottom surface 724. An isometric view of this arrangement is presented in FIG. 14.

Cap 718, which can be 3D printed, isolates the bottom end 716 from the contents of the reactor. A rubber O-ring, biocompatible adhesive or other means can be used to provide a leak-free connection between tip 710 and cap 718.

During operation, an illumination (incoming or incident) beam (supplied, for example, by an external laser source, e.g., laser 201 in FIG. 1) enters the in-situ probe at fiber in/fiber out mounting 706 and propagates downwards along optical fiber 702. Collimated by lens 712, the incoming beam progresses through the tip 710 material (along optical beam path 720a) to reach and traverse sample detection region 112. After passing through the sample detection region, the transmitted beam re-enters the tip 710 material e.g., sapphire) and is reflected from flat surfaces 722a, 724, then 722b. Geometries in which the incidence angle is greater that the critical angle eliminate refraction and result in total internal reflection, thus minimizing light losses. From surface 722b, the transmitted optical beam proceeds upwards through collecting lens 714, enters optical fiber 704, then exits the in-situ probe through the fiber in/fiber out mounting 706. Analysis of the transmitted optical signal can be performed externally, using, for instance, a controller such as controller 200 in FIG. 1.

In some implementations, tip 710 is configured in an arrangement in which the beam reflected from surface 722*b* can pass through the reactor media one more time, thus increasing the sample pathlength travelled by the light beam.

Figure 15:
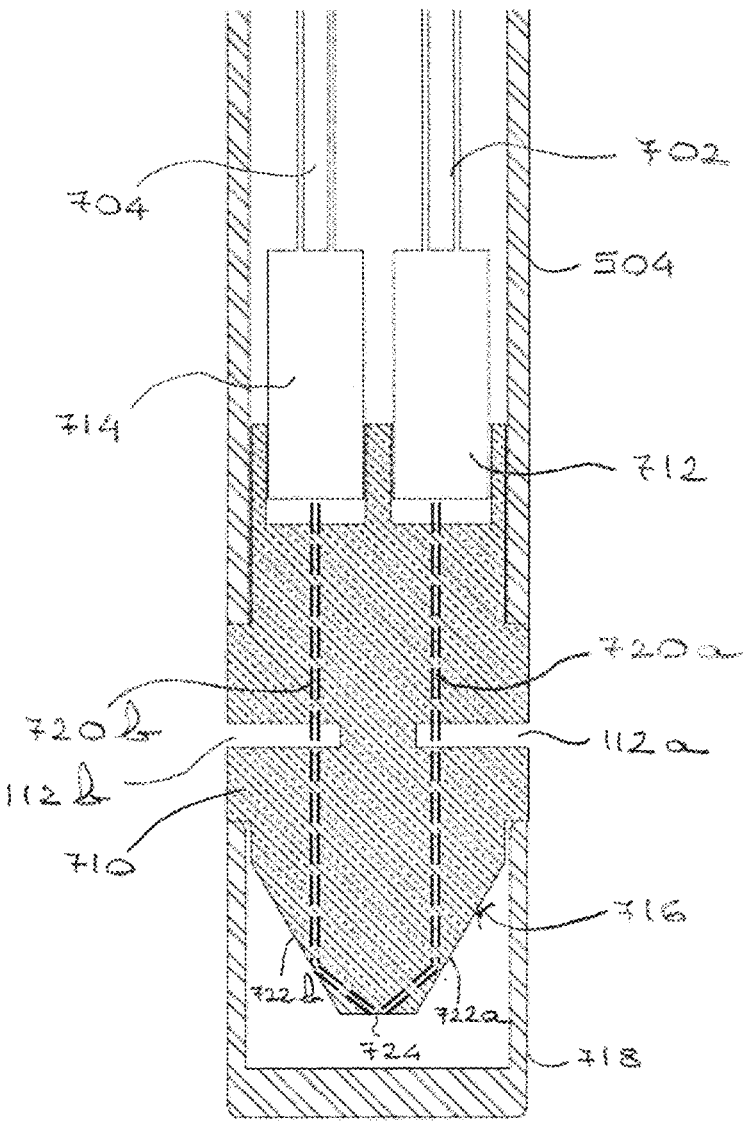
FIG. 15 is a vertical cross section of another embodiment of a tip-including portion of an in-situ probe comprising 3D printed components and using optical fibers to introduce illuminating radiation and collect transmitted light.

Various configurations can be employed. Shown in FIG. 15, for example, is tip 710 (e.g., made of sapphire) recessed to define two sample detection regions 112*a* and 112*b*, in an arrangement that provides integrity/stability to the tip. During operation, the incoming light beam progresses along optical fiber 702 and lens 712, enters tip 710, passes along optical path 720*a*, crosses sample detection region 112*a*, is reflected from flat surfaces 722*a*, 724, 722*b* (essentially as described with reference to FIG. 13) and passes through the reactor media one more time, as it crosses sample detection region 112*b* (effectively doubling the sample pathlength for recesses of the same thickness). From sample detection region 112*b*, the transmitted light progresses along optical path 720*b*, collecting lens 714 and optical fiber 704.

3D printed probes can find applications in any number of processes. In specific embodiments, the probe is used to determine, in real time and in a nondestructive manner, cell numbers and densities, measure, e.g., on an ongoing basis, secreted factors and/or other constituents present in the reactor. In one example the probe is used to measure cell viability. Based on the readings obtained, material inputs, outputs or reactor parameters can be adjusted promptly, often in automated fashion.

A 3D printed in situ probe such as probe 100, for instance, can be used in the field of cell and gene therapy. Typically, such treatments involve collecting cells from a subject's body, modifying (or reprogramming) the cells and growth of these cells to a number suitable for re-implantation.

While cell and gene therapies are expected to expand rapidly in the coming years, a remaining key challenge for researchers and producers is assessing these complicated, living medicines during manufacturing. 3D printed devices and techniques described herein can serve to precisely measure cell growth rates and quantify key metabolites in cell cultures and can be integrated into complex cell and gene therapy production processes, providing valuable insight into cellular behavior and phenotypes.

One illustrative application is the production of chimeric antigen receptor T (CAR-T) cells, a process that begins with the collection and purification of a patient's own lymphocytes, which are then genetically engineered to target specific cell surface markers and expanded to create a therapeutic infusion product. Analysis of cell growth and density is critical to this process, as the U.S. Food and Drug Administration (FDA) requires each CAR-T batch to contain a minimum number of cells. In addition, assessment of cellular phenotype via measurement of secreted metabolites, cytokines, and/or other factors can offer insight into the manufacturing process. Applying techniques described herein, this information can be obtained without the need for manual sampling, increasing efficiency and reducing the risk of contamination. In addition to CAR-T therapies, applications can also target the production of allogeneic CAR-T cells, tumor infiltrating lymphocyte therapies, induced pluripotent stem cell treatments, and other ex vivo cell or gene therapy product.

In sum, 3D printed probes in conjunction with NIR laser technology (or other in-situ analytical approaches) have the potential to enter the cell and gene therapy production process and provide important insight into cell quality and therapy development.

Embodiments described herein are further illustrated by the following non-limiting example(s).

Example 1

A probe such as 3D printed probe 100 in FIGS. 1-4, was fabricated using a Form 3B printer from Formlabs Inc., Somerville, Mass., using the associated Formlabs slicing software PreForm at 50 micron layer resolution. The resin was the Formlabs Surgical Guide Resin, a biocompatible photopolymer resin. After the 3D printing operation, the parts were washed in isopropyl alcohol (IPA) and then cured in accordance with the manufacturer's (Formlabs) instructions for this specific material.

While this invention has been particularly shown and described with references to preferred embodiments thereof, it will be understood by those skilled in the art that various changes in form and details may be made therein without departing from the scope of the invention encompassed by the appended claims.

What is claimed is:

1. A probing device for monitoring a reactor, the probing device comprising:
   a 3D printed tip section having a sample detection region defined by a gap between an optical transmission port and an optical detection port, wherein
   at least one of the optical transmission port and the optical detection port is a 3D printed layer configured to transmit sufficient light to be detected on the other side of the 3D printed layer;
   wherein the 3D printed layer has a thickness within a range of from about 100 to about 500 microns.

2. The probing device of claim 1, wherein light from the detection port is detected by a photodetector housed in the tip section.

3. The probing device of claim 1, wherein the gap defines a pathlength within a range of from about 100 microns to 10 millimeters.

4. The probing device of claim 1, further comprising a tubular body.

5. The probing device of claim 4, wherein the tubular body includes one or more 3D printed segments.

6. The probing device of claim 1, further including a 3D printed optics mount.

7. The probing device of claim 1, further including a VCSEL or LED light source that is internal to the probing device.

8. A bioreactor comprising the probing device of claim 1.

9. The bioreactor of claim 8, wherein the bioreactor comprises a bioreactor bag and the probing device is attached to the bioreactor bag.

10. A probing device for monitoring a reactor, the probing device comprising:
   a tip section having a sample detection region between an upper portion and a lower portion of the tip section;
   a transmission rod window fitted in a cavity formed by 3D printing in the upper portion;
   a detection rod window fitted in a cavity formed by 3D printing in the lower portion of the tip section, wherein,
   the transmission rod window and the detection rod window define a pathlength traveled by light in the sample detection region, wherein the pathlength is within a range of from about 2 millimeters and 20 millimeters.

11. The probing device of claim 10, wherein the tip section is made of a plastic material and the transmission rod window, the detection rod window or both are made of quartz or sapphire.

12. A bioreactor comprising the probing device of claim 10.

13. A probing device comprising:

a tube enclosing a first optical fiber and a second optical fiber;

a tip having a sample detection region and a bottom end designed for total internal reflection, wherein, a light pathway follows the first optical fiber, enters the tip, passes through a sample detection region, undergoes total internal reflection in the bottom end, exits the tip and enters the second optical fibers, wherein a pathlength of the sample detection region is within a range of from about 2 millimeters and 20 millimeters.

14. A system comprising the probing device of claim 13, a light source for supplying light to the first optical fiber and a detector for detecting light received from the second optical fiber.

15. The probing device of claim 13, wherein the tip has an additional sample detection region.

16. The probing device of claim 13, wherein the tube is formed by 3D printing and the tip is made of sapphire.

17. A bioreactor comprising the probing device of claim 13.

18. A method for preparing a probe for monitoring a reactor, the method comprising:

3D printing a tip section of the probe to define a recess forming a sample detection region, wherein the recess is dimensioned according to the wavelength region of the light passing through the sample detection region.

19. A probing device for monitoring a reactor, the probing device comprising:

a tip section having a sample detection region defined by a gap between an optical transmission port and an optical detection port;

a photodetector housed in the tip section for detecting light received through the optical detection port;

an amplification printed circuit board is included in the tip section for amplifying the photodiode signal, wherein the probing device or a component thereof is 3D printed, wherein a pathlength of the sample detection region is within a range of from about 2 millimeters and 20 millimeters.

20. A probing device for monitoring a reactor, the probing device comprising:

a free space optical beam path enclosed in an inner tube, the inner tube being positioned within an outer tube in an off-center geometry;

a tip section having a sample detection region defined by a gap between a transmission rod and a detection rod; and a photodetector housed in the tip section for detecting light received through the detection rod.

* * * * *